Figure 19:
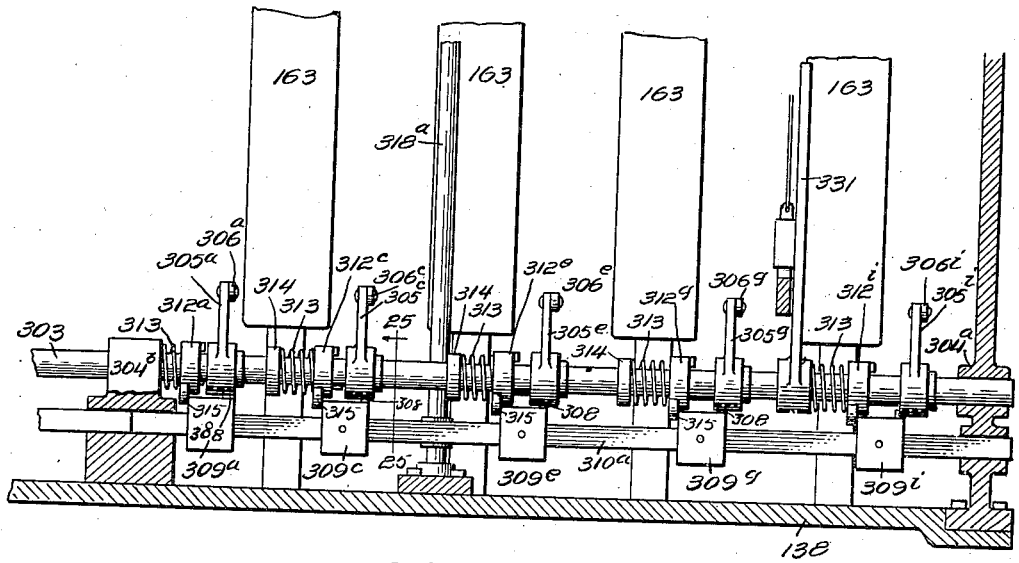

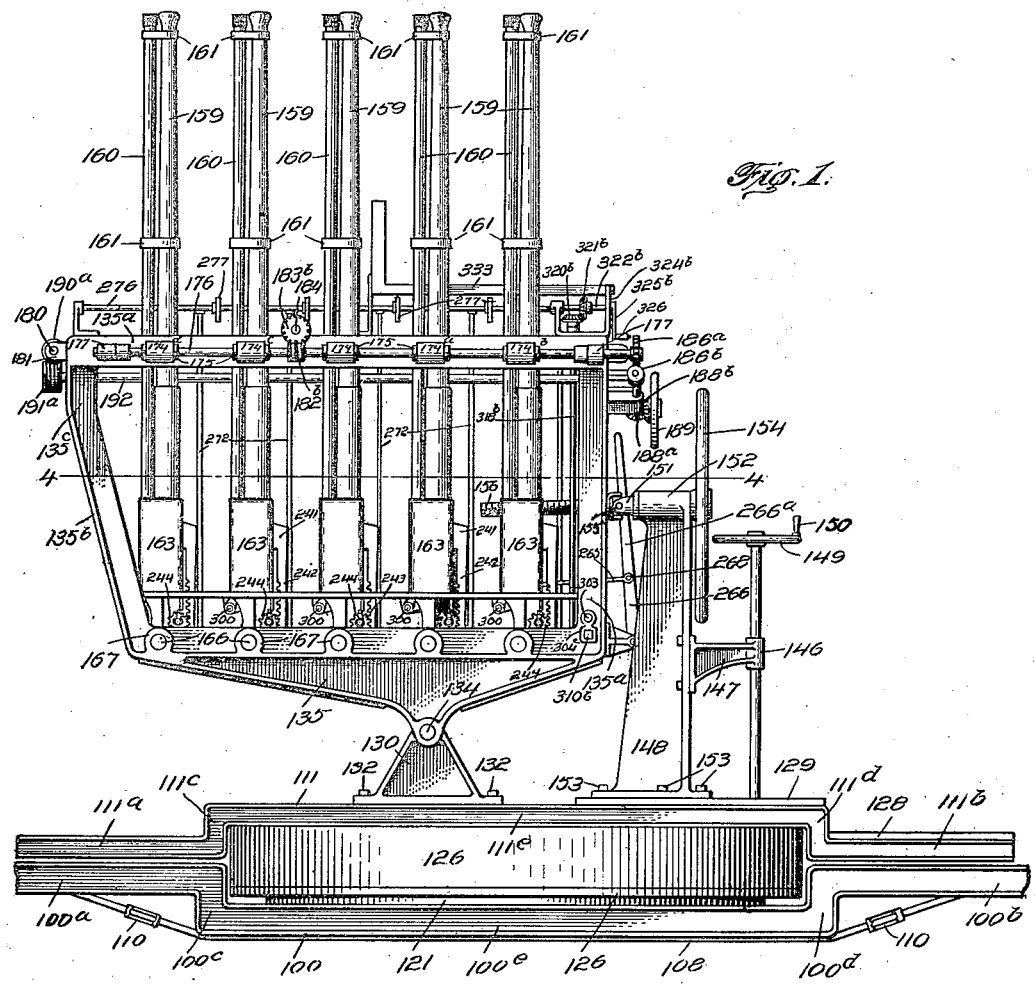

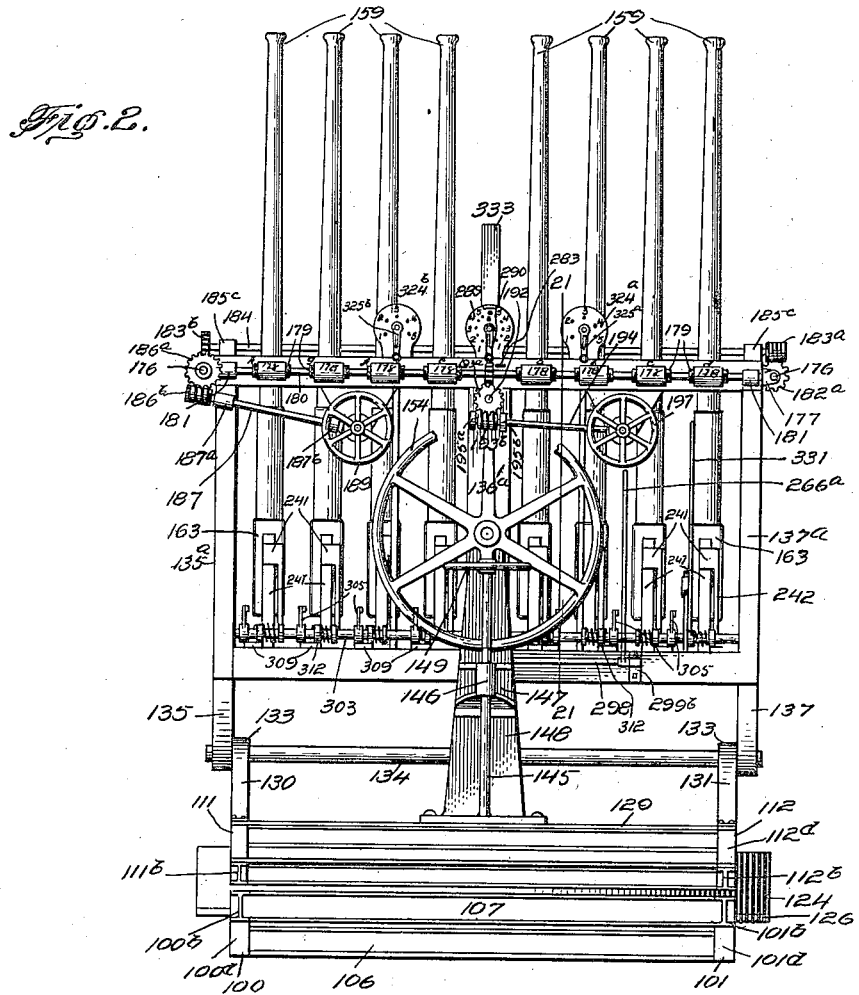

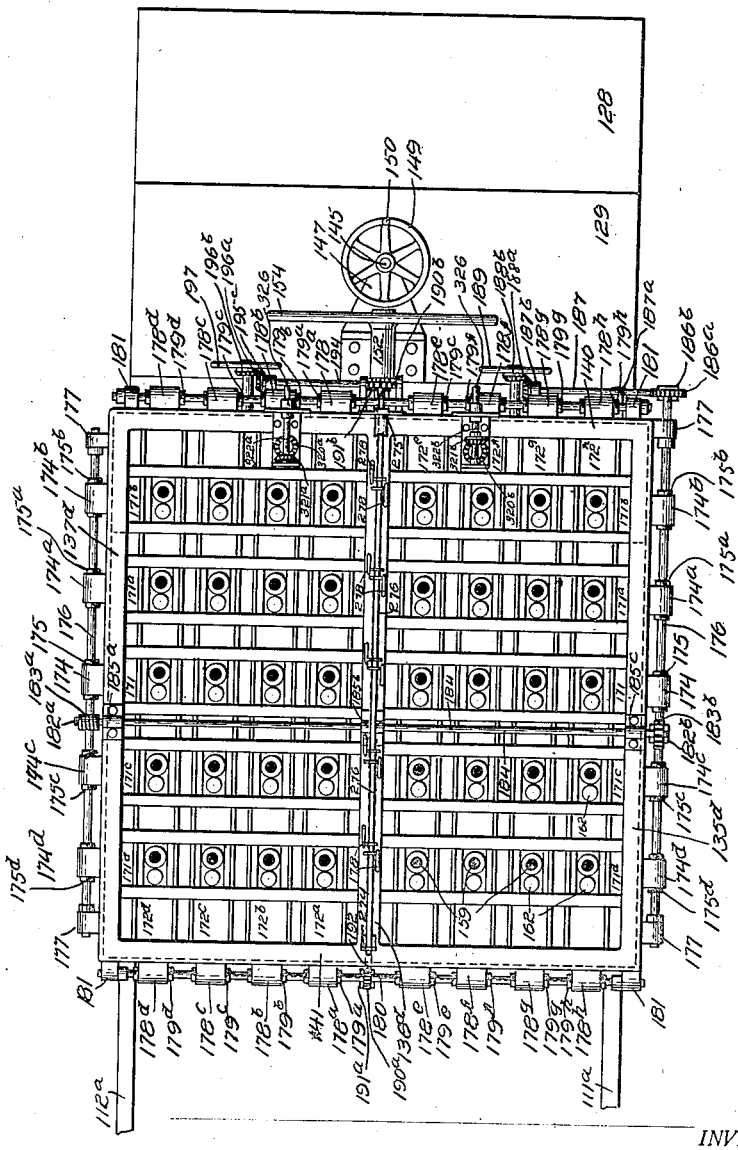

Jan. 23, 1923.
P. A. DUPCZA.
ANTIAIRCRAFT MACHINE GUN.
FILED DEC. 30, 1921.
1,443,249.
15 SHEETS—SHEET 4.
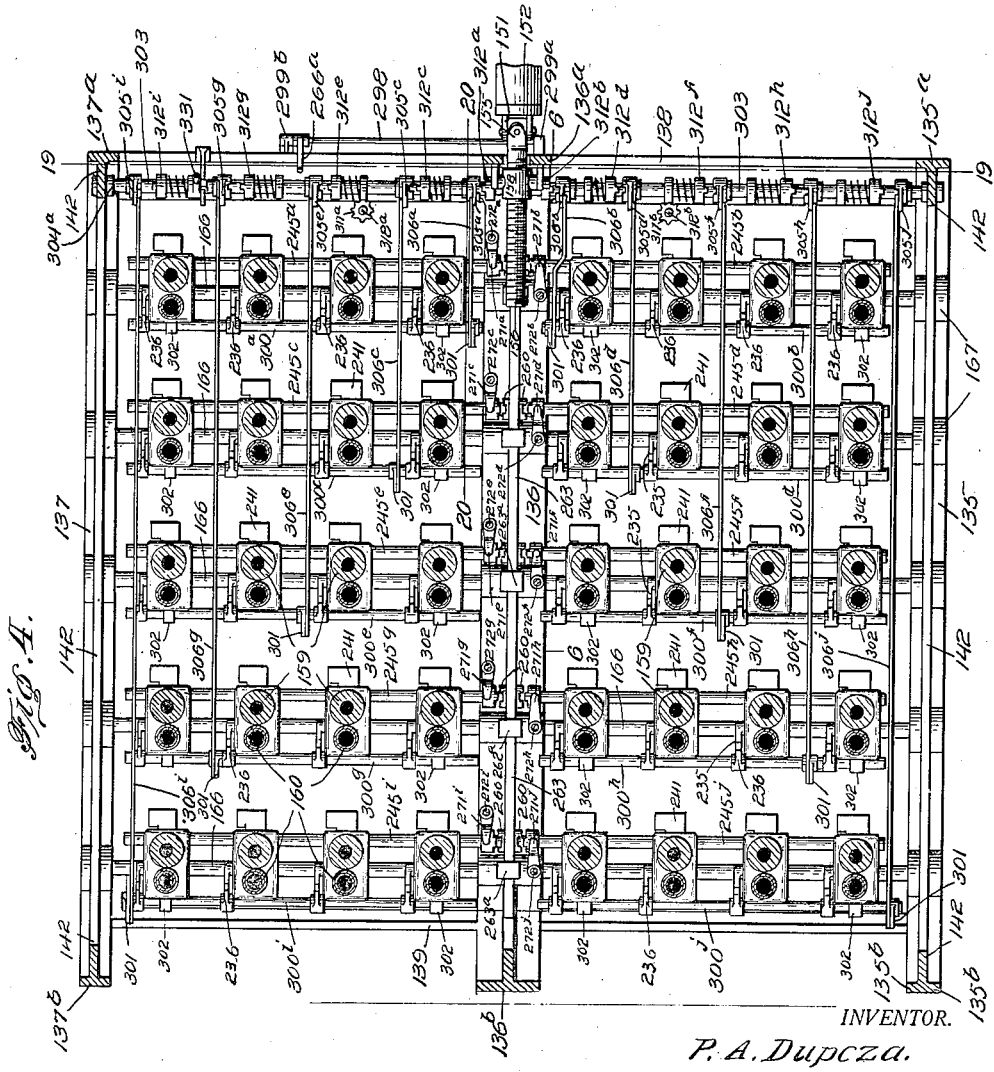
INVENTOR.
P. A. Dupcza.
BY
Geo. P. Kimmel.
ATTORNEY.

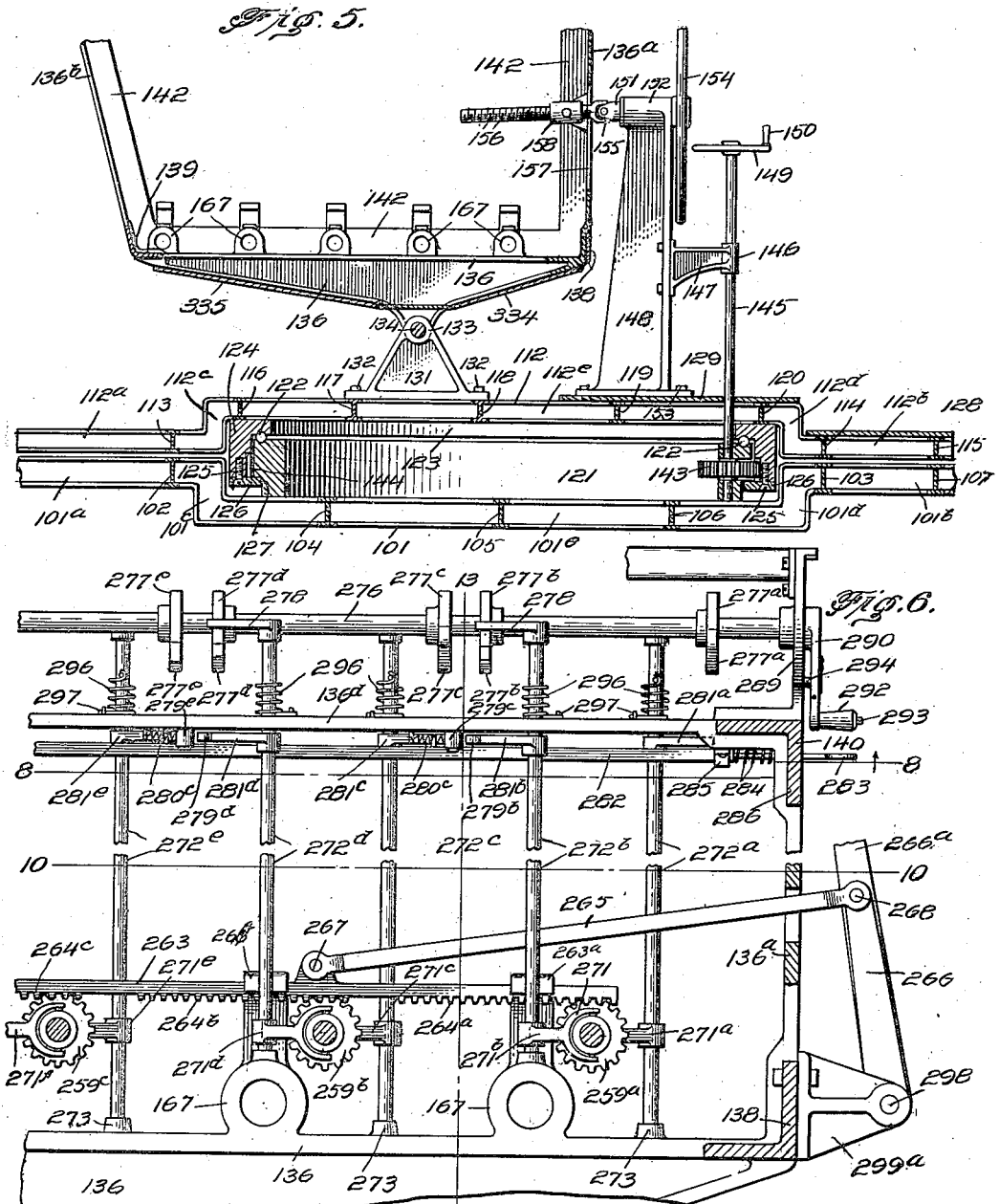

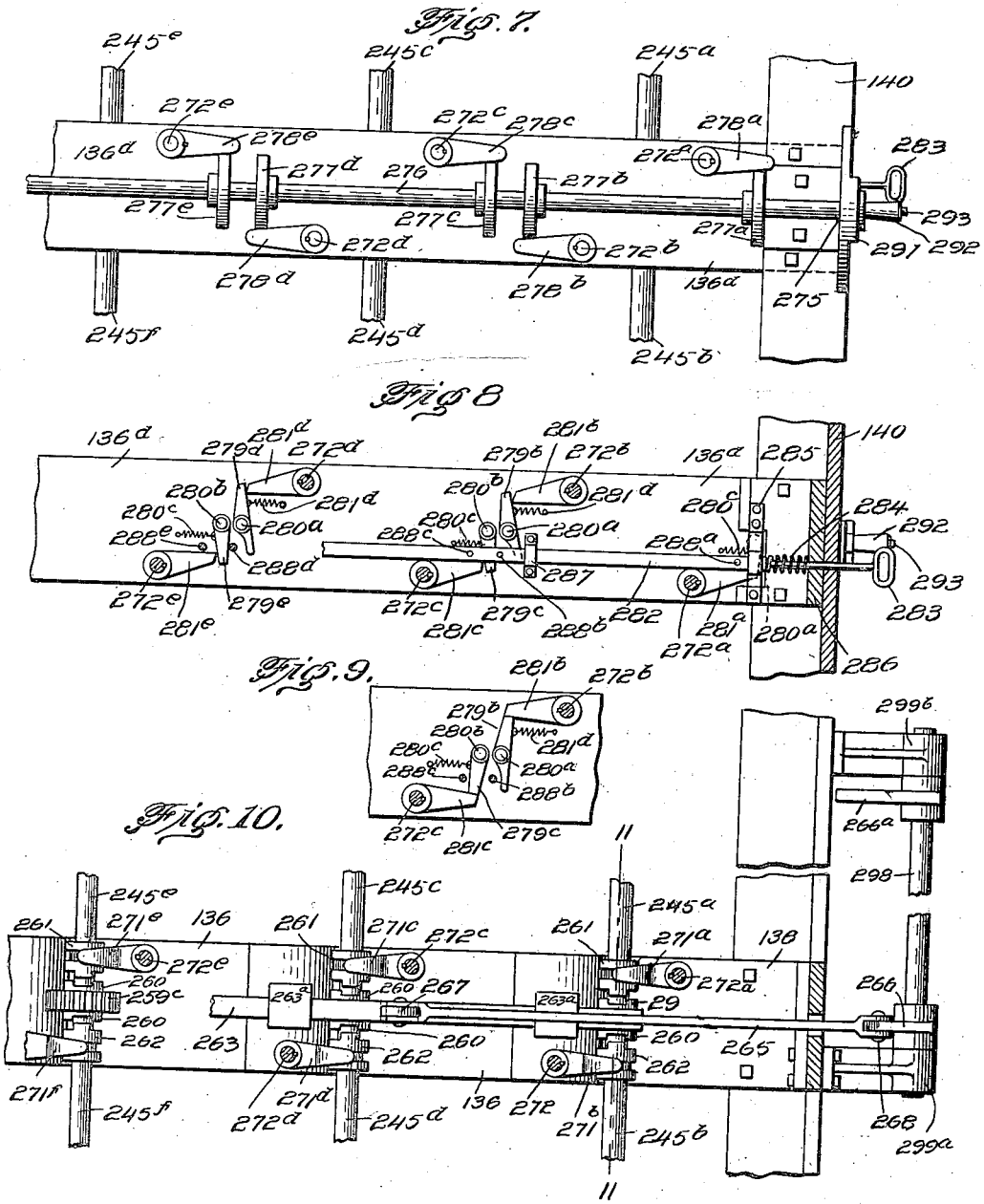

Jan. 23, 1923.
P. A. DUPCZA.
ANTIAIRCRAFT MACHINE GUN.
FILED DEC. 30, 1921.
1,443,249.
15 SHEETS—SHEET 7.
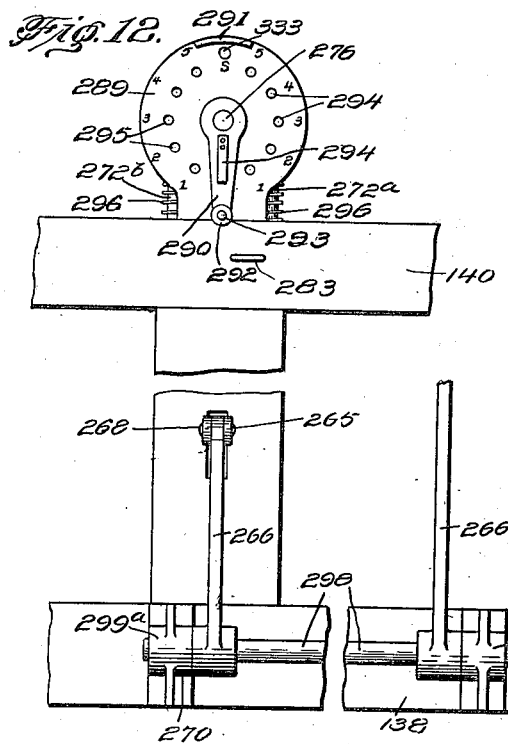
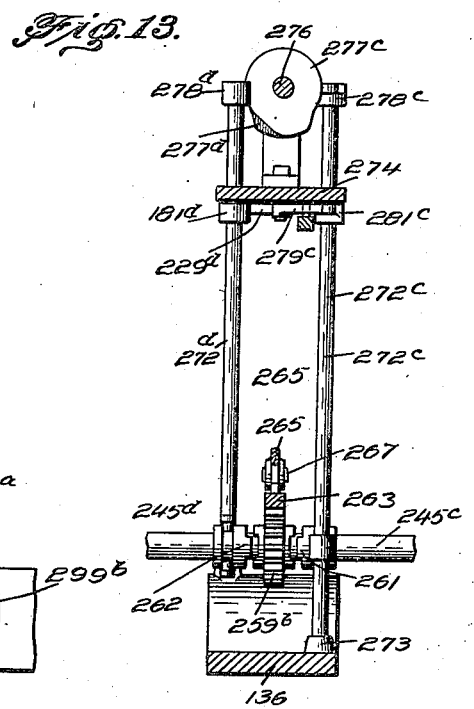
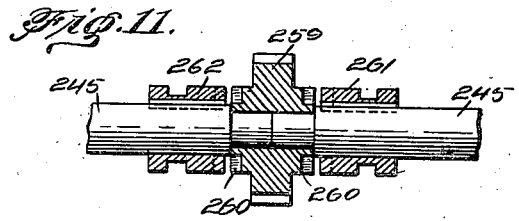
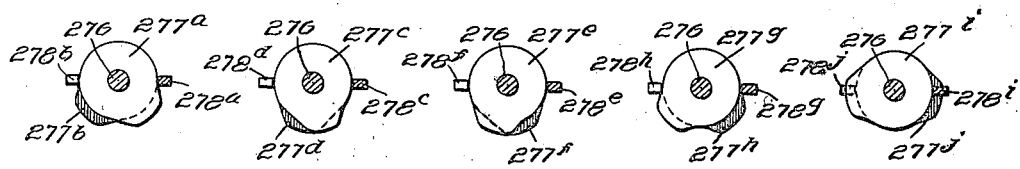
P. A. Dupcza
INVENTOR.
BY
Geo. P. Kimmel
ATTORNEY.

Jan. 23, 1923.

P. A. DUPCZA.
ANTIAIRCRAFT MACHINE GUN.
FILED DEC. 30, 1921.

1,443,249.

15 SHEETS—SHEET 8.

INVENTOR.
P. A. Dupcza.
BY
Geo. P. Kimmel.
ATTORNEY.

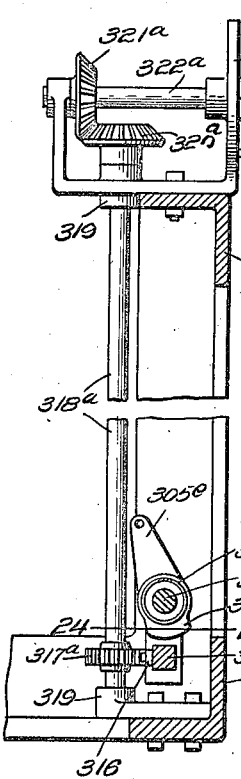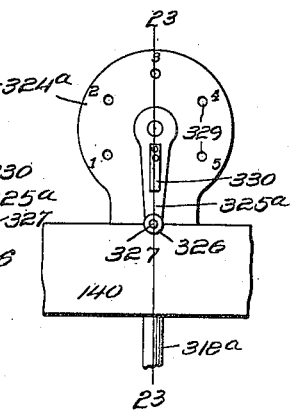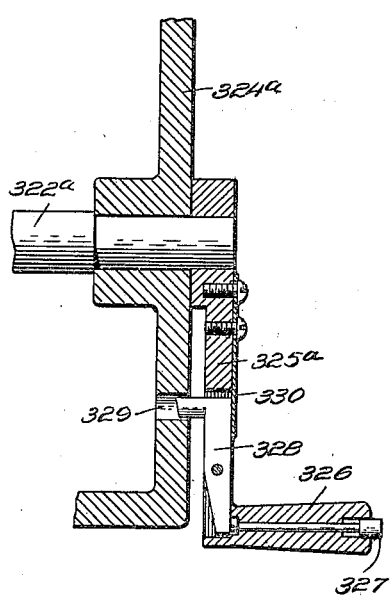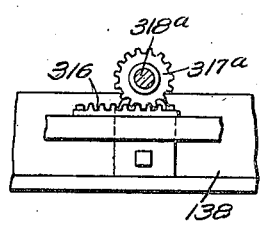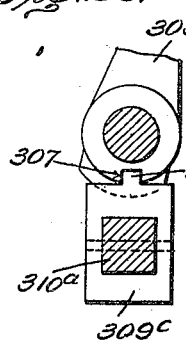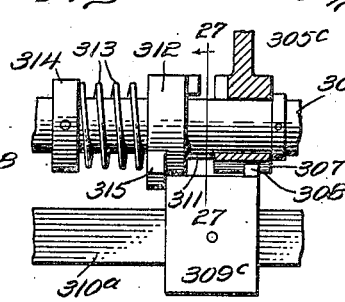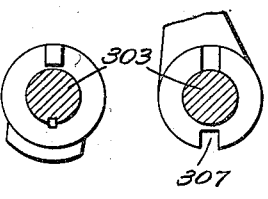

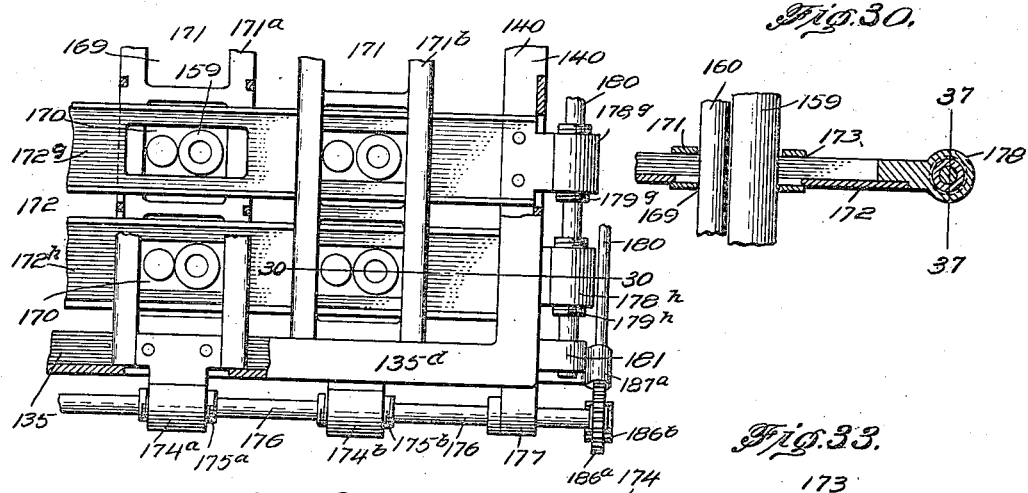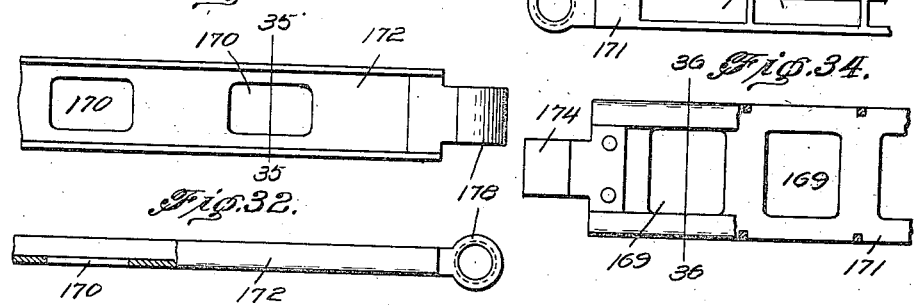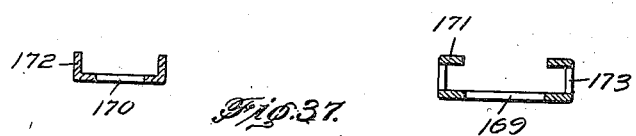

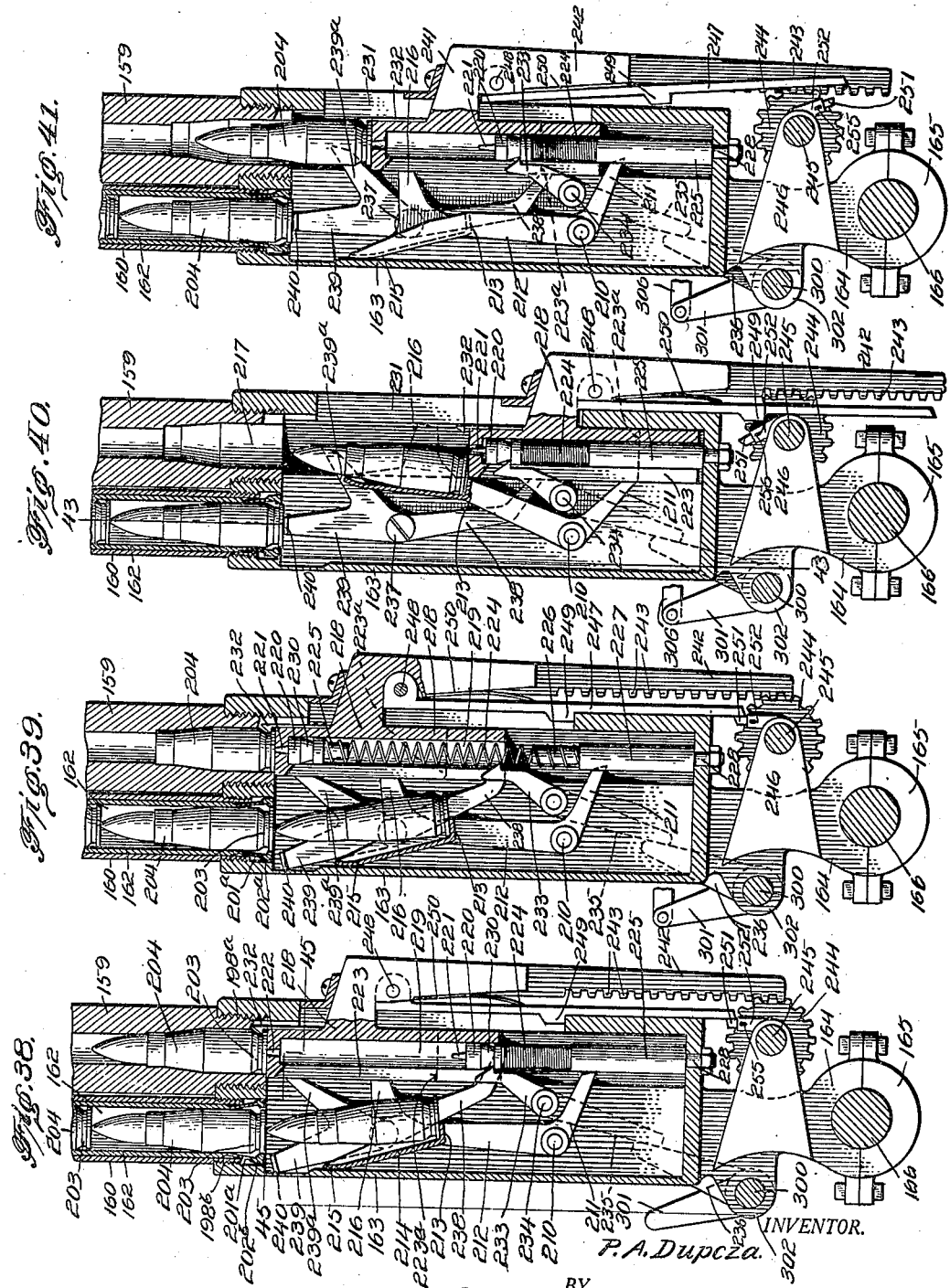

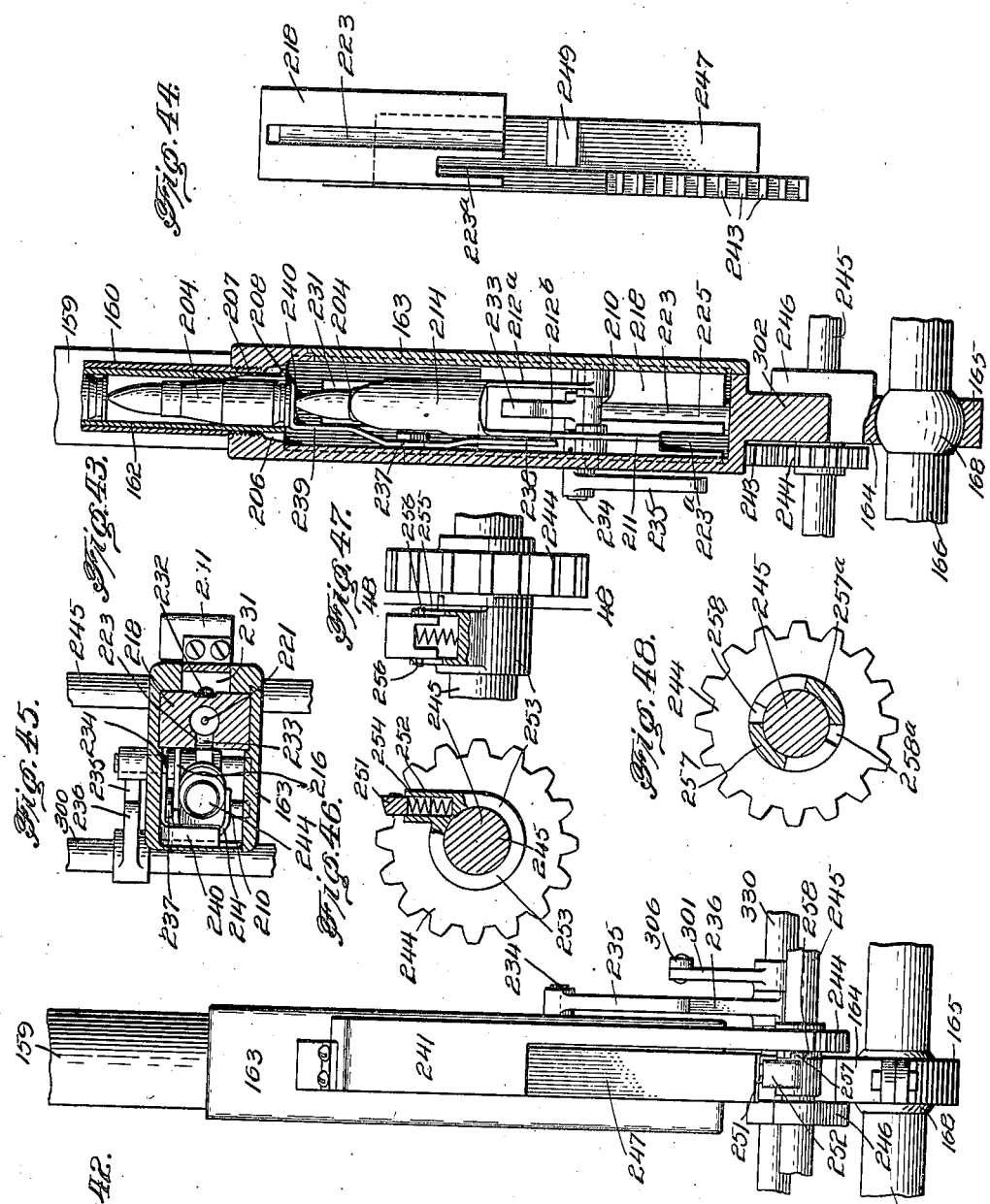

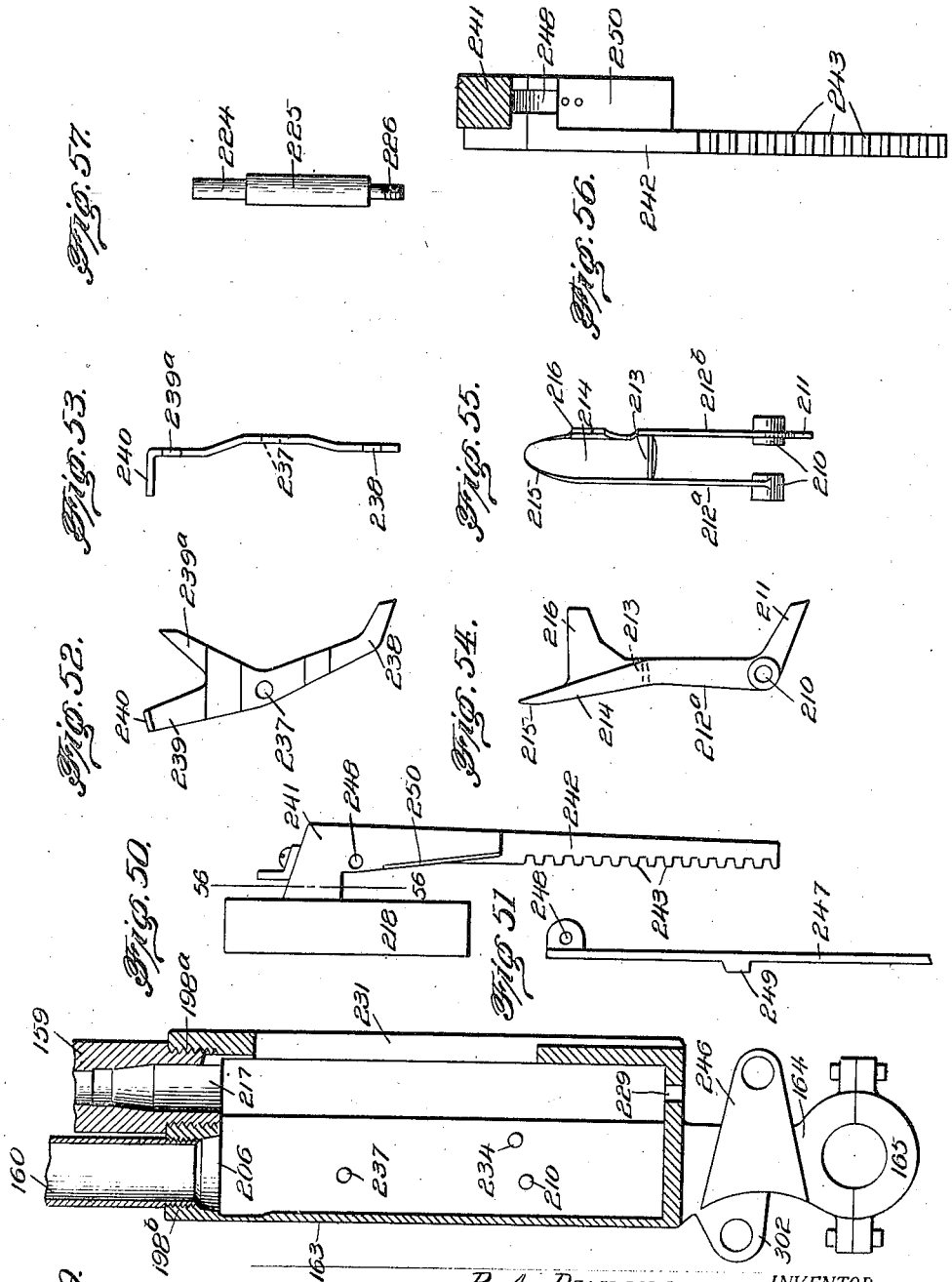

Jan. 23, 1923.
P. A. DUPCZA.
ANTIAIRCRAFT MACHINE GUN.
FILED DEC. 30, 1921.
1,443,249.
15 SHEETS—SHEET 14.
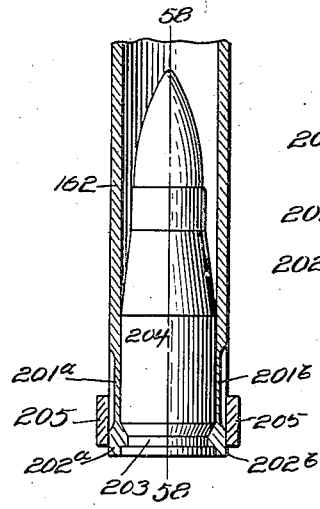
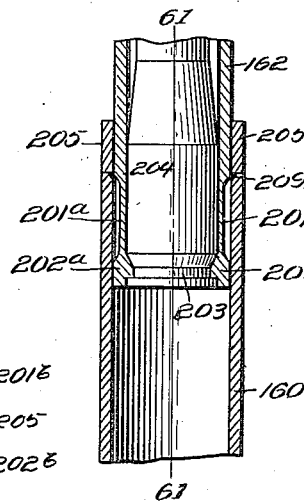
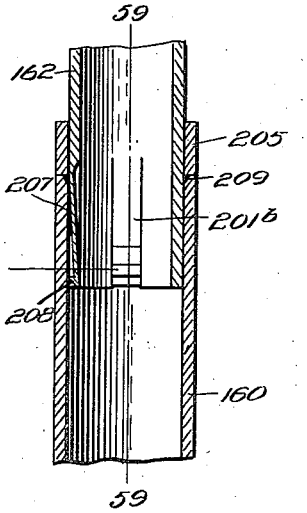
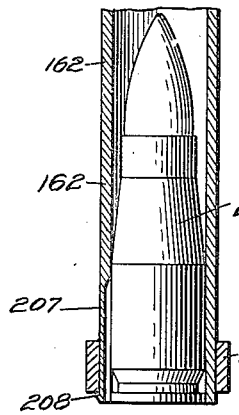
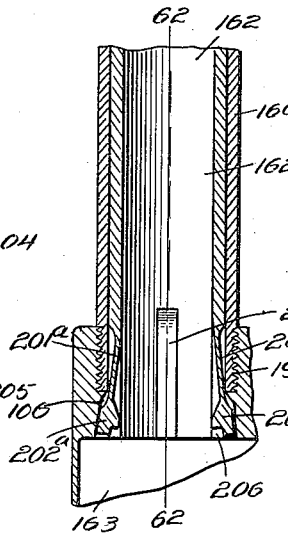
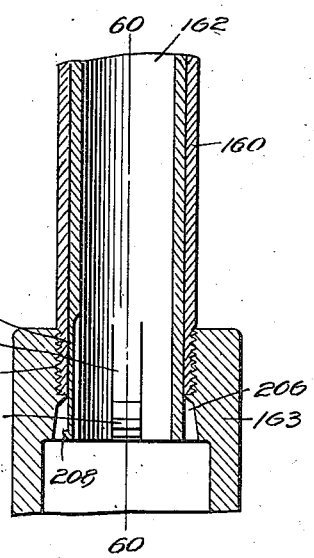
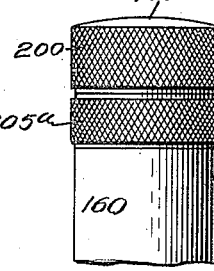
P. A. Dupcza, INVENTOR.
BY Geo. F. Kimmel, ATTORNEY.

Jan. 23, 1923.
P. A. DUPCZA.
ANTIAIRCRAFT MACHINE GUN.
FILED DEC. 30, 1921.
1,443,249.
15 SHEETS—SHEET 15.
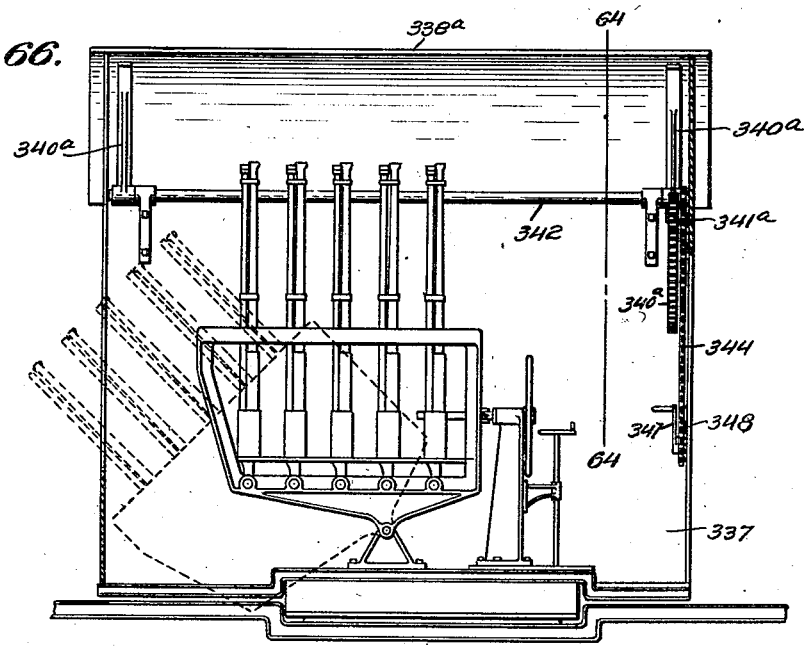
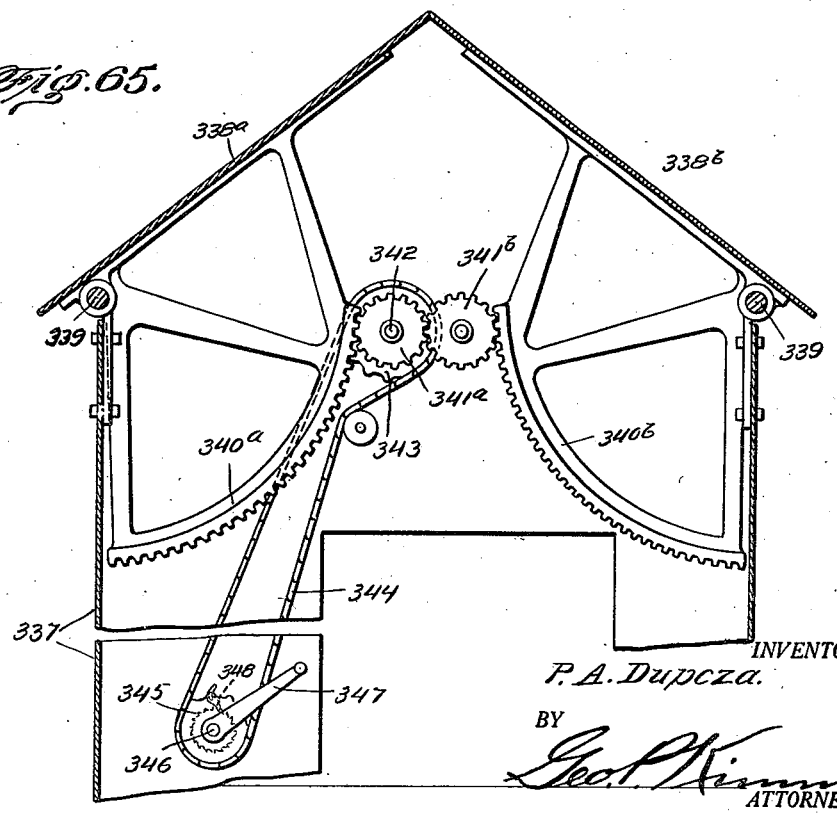
INVENTOR.
P. A. Dupcza.
BY
Geo. P. Kimmel
ATTORNEY.

Patented Jan. 23, 1923.

1,443,249

UNITED STATES PATENT OFFICE.

PETER A. DUPCZA, OF ALTOONA, PENNSYLVANIA, ASSIGNOR OF ONE-HALF TO ANTON BOGDONOV, OF ALTOONA, PENNSYLVANIA.

ANTIAIRCRAFT MACHINE GUN.

Application filed December 30, 1921. Serial No. 526,040.

*To all whom it may concern:*

Be it known that I, PETER A. DUPCZA, a citizen of the United States, residing at Altoona, in the county of Blair and State of Pennsylvania, have invented certain new and useful Improvements in Antiaircraft Machine Guns, of which the following is a specification.

This invention appertains to certain improvements in machine guns or the like, and more particularly to a type of the same adapted for accurate and effective use against aircraft.

The principal object of the invention is to provide for an anti-aircraft machine gun embodying a plurality of barrels massed together in a manner to be operated as a unit, or as a group of units, for the creation of a zone of fire of a relatively large area, but sufficiently concentrated as to be effective up to and including the maximum range of the gun.

Another object of the invention is to provide for a gun as characterized, and one which is capable of being manufactured in various sizes for the firing of ammunition ranging upward from the ordinary .30 calibre cartridge as used in the army rifle to and including any and all of the cartridge types of ammunition, such as the 37 and 77 millimeter sizes thereof, the 37 millimeter size of such ammunition being deemed the most satisfactory and effective for general use.

A further object of the invention is to provide for a gun of the class mentioned, and one which is of a refined mechanical construction and arrangement as to be extremely durable and efficient in use, and capable of being mounted in any suitable manner for transportation from one point to another, as when being used as an offensive weapon in the zone of battle operations and frequent change of position is necessary, or on a permanent or semi-permanent base, as when being used as a defensive weapon along the lines of communication or in defense of cities, towns, depots, or the like, or on board war vessels.

Another object of the invention is to provide for a gun of the class set forth, and one embodying an efficient form of mount allowing for the swinging of the gun through 360° in a horizontal plane, and for the elevation of the same through an arc of approximately 45°, or from an angle of 45° above the horizontal to full 90° vertically, the range of elevation may, however, be varied to any desired degree greater than 45° by slight variations in the height of the gun frame supports carried on the mount.

A further object of the invention is to provide a gun of the type specified, and one embodying a novel means for mounting the several barrels thereon, whereby to establish an angle of divergence between certain of the barrels, or certain groups of such barrels, so that the cone of fire of the same may be varied from a relatively small area of concentration, as when the barrels are disposed one in normally vertical parallel relation with respect to the other, to one of a greatly increased area, which variation is desired and necessary to compensate for weather conditions, and to render the fire from the gun more effective accordingly for various ranges.

Another object of the invention is to provide for a gun of the character set forth, and one embodying a means for effecting the firing of the several barrels simultaneously whereby to utilize the full effectiveness of their combined cones of fire, said means being also operable for effecting the firing of the barrels in groups, one group independently of the other, and in sequence of their grouped arrangement within the frame carried on the gun mount.

A still further object of the invention is to provide for an anti-aircraft machine gun of the kind specified, and one embodying an extremely simple and efficient loading mechanism, whereby the several barrels of the gun are to be loaded simultaneously, after all of the same have been fired, or separately in their grouped arrangement, or in any number of such groups as may be desired or necessary, the mechanism being inoperative throughout the firing of the several barrels whether or not the latter are fired simultaneously or by groups.

A further object of the invention is to provide a separate magazine for each of the several barrels of the gun, and these magazines are readily removable from the magazine casings or tubes associated with each barrel and for loading and reloading purposes, and each magazine is provided with a means whereby to retain the cartridges within the same during the transportation and placing thereof in position within the said magazine casings or tubes, said means being released upon the insertion of the magazines into the latter, and automatically acting to secure the magazines in operative position.

With the foregoing and other objects in view, the invention resides in the certain novel and useful construction, arrangement and operation of parts and mechanisms as will be hereinafter more fully described, set forth in the appended claims, and illustrated in the accompanying drawings, in which:—

Figure 20:
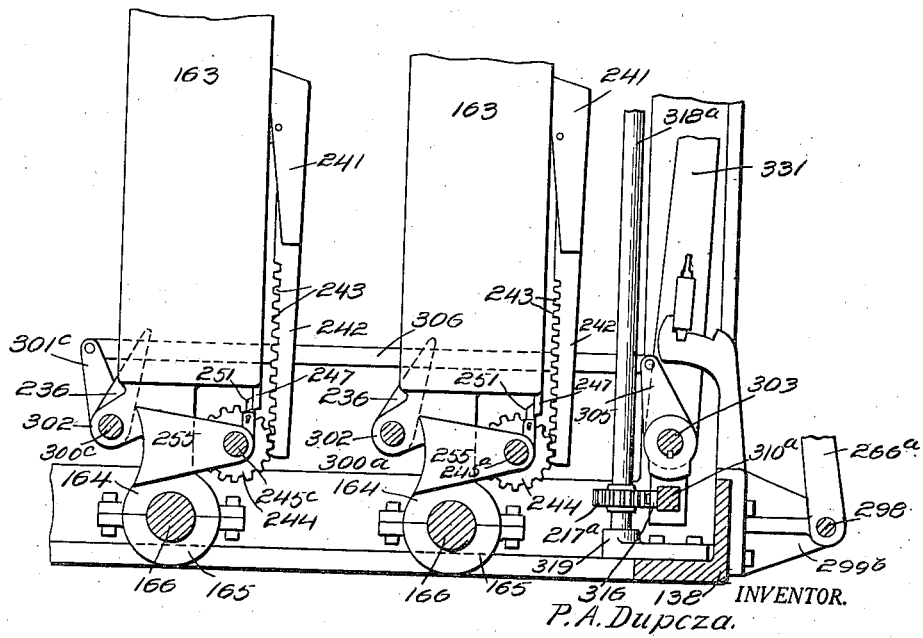

Figure 1 is a side elevation of a preferred embodiment of the invention,

Figure 2 is a front elevation showing the several control devices for effecting the operation of the gun, Figure 3 is a top plan view, Figure 4 is a horizontal section taken on the line 4—4 of Figure 1, Figure 5 is a vertical longitudinal sectional view illustrating the gun mount and barrel supporting frame carried thereby with the barrels removed therefrom, Figure 6 is an enlarged fragmentary vertical section taken on the line 6—6 of Figure 4, Figure 7 is a fragmentary top plan view of the supporting plate or bar of the setting mechanism of the reloading mechanism, and shows the said setting mechanism in its normal position, Figure 8 is a fragmentary bottom plan view thereof, with the setting mechanism in the same or normal position, Figure 9 is another fragmentary bottom plan view showing a portion of the setting mechanism in its set position, whereby to admit of the operation of the reloading mechanism of an adjacent pair of gun groups, Figure 10 is a fragmentary top plan view of the center or base supporting member of the gun supporting frame, and shows certain portions of the reloading mechanism carried thereby, Figure 11 is a transverse section taken on the line 11—11 of Figure 10, Figure 12 is a fragmentary front elevation of the gun frame, and shows the selective control device for the setting mechanism of the reloading mechanism, Figure 13 is a section taken on the line 13—13 of Figure 6, Figures 14 to 18, inclusive, are sectional details showing the relative positions of the several pairs of setting cams of the setting and reloading mechanisms, when in their zero positions as indicated at the zero position on the dial as shown in Figure 12, Figure 19 is an enlarged fragmentary vertical section taken on the line 19—19 of Figure 4, and shows a portion of the firing mechanism, Figure 20 is an enlarged fragmentary vertical section taken on the line 20—20 of Figure 4, Figure 21 is a fragmentary sectional view taken on the line 21—21 of Figure 2, Figure 22 is a face view of the selective control device of the firing mechanism, Figure 23 is a vertical section taken on the line 23—23 of Figure 22, Figure 24 is a section taken on the line 24—24 of Figure 21, Figure 25 is a fragmentary rear elevation, partly in section, of one of the locking devices of the firing mechanism, Figure 26 is a fragmentary side elevation, partly in section, of one of the locking devices for the firing mechanism, Figures 27 and 28 are sections taken on the line 27—27 of Figure 26, and looking in opposite directions, Figure 29 is an enlarged fragmentary plan view of the supporting frame, and showing in detail the manner of assembling and securing the barrels in position therein, Figure 30 is a fragmentary section taken on the line 30—30 of Figure 29, Figure 31 is a fragmentary plan view of one of the longitudinal beams or bars used for spacing the gun barrels in position, Figure 32 is a fragmentary edge view of the beam or bar as shown in Figure 31, Figure 33 is a fragmentary edge view of one of the transverse beams or bars arranged at right angles to the longitudinal beams or bars as is shown in Figure 31 and interlocked therewith, Figure 34 is a fragmentary top plan view of the form of transverse beam as shown in Figure 33, Figure 35 is a transverse section taken on the line 35—35 of Figure 31, Figure 36 is a transverse section taken on the line 36—36 of Figure 34, Figure 37 is a fragmentary vertical section taken on the line 37—37 of Figure 30, Figure 38 is an enlarged fragmentary section showing the firing and loading mechanisms of one of the several gun barrels, the firing mechanism being in position for the firing operation, Figure 39 is a view similar to that of Figure 38, but showing the firing mechanism at the completion of the firing operation, with the loading mechanism ready for the reloading operation, Figure 40 is a similar view showing the firing mechanism in partially reset firing position, with the loading mechanism moved to its initial loading position, Figure 41 is another similar view showing the firing mechanism still in its reset firing position, with the loading mechanism on its final movement to completed loading position, Figure 42 is a fragmentary elevation of the lower end of one of the several barrels, and of the firing and loading mechanism casings thereof, and showing the operating means for effecting the actuation of the firing and loading mechanisms, Figure 43 is a fragmentary vertical section taken on the line 43—43 of Figure 40, Figure 44 is a plan view of the inner face of the actuating rack of the bolt of the firing mechanism, and of the locking means therefor, Figure 45 is a horizontal section taken on the line 45—45 of Figure 38, Figure 46 is an elevation, partly in section, of one of the actuating gears for effecting the release of the locking means and the operation of the firing mechanism, Figure 47 is a fragmentary detail, partly in section, of the actuating gear as shown in Figure 46, Figure 48 is a section taken on the line 48—48 of Figure 47, Figure 49 is a fragmentary sectional view of the casings or locks of one of the gun barrels with the firing and loading mechanisms removed therefrom, Figure 50 is a detail side elevation of one of the firing bolts and its operating rack, Figure 51 is a side view of the locking bar of one of the gun barrel firing and loading mechanisms.

Figure 52 is a detail view of one of the devices for retaining the lowermost cartridge within a magazine, Figure 53 is a side view of the device as shown in Figure 52, Figure 54 is a side view of the cartridge carrier device for effecting the transfer of a cartridge from the magazine to loading position, Figure 55 is a front view of the device as shown in Figure 54, Figure 56 is a sectional view of the gun bolt operating rack, the same being taken on the line 56—56 of Figure 50, Figure 57 is an enlarged detail in elevation of one of the posts within the lock casings for supporting the firing plunger springs in position, Figure 58 is an enlarged fragmentary section of the lower end of one of the magazines and showing the means for retaining the lowermost cartridge therein after the same has been filled with the required number of such cartridges, and prior to the insertion of the magazine into the magazine casing or tube of a gun barrel.

Figure 59 is a similar section taken on the line 58—58 of Figure 58, and shows the stop means or lug for preventing the accidental removal of the locking collar of the cartridge retaining means from the lower end of the magazine, Figure 60 is an enlarged fragmentary sectional view of the upper end of one of the magazine casings or tubes associated with each of the gun barrels, the same being taken on the line 59—59 of Figure 62, and showing the manner of release of the locking collar of the cartridge retaining means during the initial movement of insertion therein of a magazine, Figure 61 is a similar view of the lower end of a magazine casing or tube and the connected end of the firing and loading mechanism casing associated therewith, the same being taken on the line 60—60 of Figure 63, and showing the means for effecting the complete release of the cartridge retaining means, and of the interlocking action of the latter with the said firing and loading mechanism casing for retaining the magazine in position during the firing operation of the gun.

Figure 62 is a fragmentary section taken on the line 61—61 of Figure 60 and showing the position of the stop means or lug after the release of the locking collar and of its engagement with the upper free end of a gun barrel, Figure 63 is a fragmentary sectional view taken on the line 62—62 of Figure 61, and showing the position of the stop means or lug after the cartridge retaining means have been released from their engagement with the lowermost cartridge and have sprung into interlocked engagement with the firing and loading mechanism casing, Figure 64 is a fragmentary elevation of the upper end of one of the gun barrel magazine casings or tubes, and shows the enlarged closed end of an inserted magazine and the cartridge retaining means locking collar positioned on the free end edge of the casing or tube beneath the said enlarged closed end of the magazine, with the enlarged closed end of the magazine and the locking collar as being milled or knurled to facilitate the manipulation of the same in the removal, loading, and insertion of the magazine, Figure 65 is a vertical transverse section through a housing for the gun as a whole, and showing a means for opening and closing the roof portion of the housing previous to and after the firing of the gun, and, Figure 66 is a vertical longitudinal section taken on the line 64—64 of Figure 65.

Referring to the drawings, wherein similar characters of reference designate corresponding parts throughout the several views thereof, the present embodiment of the gun-mount of the anti-aircraft gun, as shown particularly in Figures 1, 2, 3, and 5 thereof, comprises a lower pair of spaced base elements 100, 101, preferably of I beam form, one spaced from the other to the full width of the gun mount, and each of the same are angularly bent at points inwardly from their opposite end portions 100ª, 100ᵇ, and 101ª, 101ᵇ, as at 100ᶜ, 100ᵈ and 101ᶜ, 101ᵈ, to provide for centrally depressed portions 100ᵉ, 101ᵉ, respectively and these elements or beams are connected together at their opposite end portions by means of transversely extending elements or I beams 102 and 103, and at their aligned depressed portions 100ᵉ and 101ᵉ by means of similarly disposed elements or I beams 104, 105 and 106, substantially as is shown in Figure 5. The upwardly offset end portions 100ᵇ, 101ᵇ, however, are to be extended to a greater length than that of the end portions 100ª, 101ª, and are further connected together, in addition to the transverse bar or beam 103, by means of one or more transverse bars or beams 107. These lower supporting bars or beams of the gun mount, so constructed, may constitute the chassis of a motor truck, or the same may be suitably bolted or otherwise secured to a fixed, permanent, or semi-permanent supporting base or bed of steel, concrete or the like (not shown), depending upon the design of the gun and the purposes of its intended use. The opposite and upwardly offset end portions 100ª, 101ª and 100ᵇ, 101ᵇ, of the lower beams 100, 101, are preferably connected together by means of brace members or rods 108, 109, respectively, which are preferably of sectional construction, with the sections thereof adjustably connected together by means of turnbuckles 110, and are arranged to have their intermediate portions extend beneath the depressed portions, 100ᵉ, 101ᵉ, to brace or reinforce the same, and to otherwise aid in the support of the gun structure to be mounted thereon. Mounted above the bars or beams 100, 101, but unconnected with respect thereto, are a second pair of bars or beams 111, 112, which are angularly bent inwardly from their outwardly disposed and downwardly offset end portions 111ª, 111ᵇ, and 112ª, 112ᵇ, as at 111ᶜ, 111ᵈ and 112ᶜ, 112ᵈ, to provide upwardly depressed portions 111ᵉ, 112ᵉ corresponding to and, except for being disposed in reversed position, otherwise identical with the formation of the said bars or beams 100, 101. The bars or beams 111, 112, are connected together at their opposite end portions 111ª, 111ᵇ, and 112ª, 112ᵇ, by means of transversely extending cross bars or beams 113, 114 and 115, and at their aligned upwardly depressed portions 111ᵉ, 112ᵉ, by means of similar cross bars or beams 116, 117, 118, 119 and 120.

Secured in position on the bars or beams 100, 101 and within the depressed portions 100ᵉ, 101ᵉ, thereof is an annular rail or member 121 having a raceway formed in its upper face for the reception of a circular series of ball bearings 122, which are engaged in a similar race-way formed in the inner flanged portion 123 of an annular member or turn-table gear 124, which in turn, is fitted over the rail 121, and is revoluble thereon. Secured on the lower edge of the turn-table gear 124 by means of lag screws or the like 125, is a retaining ring 126 having a width to engage under an annular shouldered portion 127 formed in the lower portion of the outer peripheral face of the annular rail 121. The bars or beams 111 and 112, together with their several cross bars and beams as hereinbefore mentioned, are secured in position upon the turn-table gear 124 and constitutes a turn-table platform frame revoluble therewith, and upon which the machine gun and its control and operating mechanisms are mounted, and from which the same are to be manipulated. Secured on and extending cross ways of the upper faces of the downwardly offset end portions 111ᵇ, 112ᵇ, of the upper longitudinal bars or beams 111, 112, and on the adjacent upper face portions of the upwardly depressed portions 111ᵉ, 112ᵉ, thereof, are flooring sections 128 and 129, respectively, of sheet steel, or other suitable materials, to form platforms from which the gun crew will fire the gun and be able to conveniently manipulate any and all of the several control and operating mechanisms thereof. Rising from the upper faces of the cross bars or beams 117, 118, connecting the upper longitudinal bars or beams 111, 112, and to one side of the transverse center of the turn-table frame, is a set of standards 130, 131, disposed one in transverse alignment with respect to the other, and which are in the form of substantially triangular shaped castings secured in position at the opposite ends of their base portions by means of bolts or the like 132, and have their upper ends or apexes formed to provide bearing portions 133, in which are journalled the opposite ends of a pivot bar or shaft 134.

Mounted for vertical, pivotal or swinging movement on the pivot bar or shaft 134, is a main frame, comprising a set of longitudinally disposed frame sections consisting of elongated base portions or members 135, 136, and 137, in the form of heavy castings, of substantially inverted triangular formation, the points of connection thereof with the shaft 134 being at the lowermost or apex ends thereof, while the forward ends of the same are of a greater length than the rearwardly disposed ends substantially as is shown. Rising from the rear and forward ends of these base portions or members 135, 136 and 137 are posts or standards 135ª, 135ᵇ; 136ª, 136ᵇ; and 137ª, 137ᵇ, respectively, the rear of which posts or standards 135ª, 136ª, and 137ª are perpendicular thereto, while the forward posts or standards 135ᵇ, 136ᵇ, and 137ᵇ are inclined in a forward direction from their points of connection with the same and terminate at their upper ends in vertical extending portions 135ᶜ, 136ᶜ, and 137ᶜ, respectively. The frame sections, thus constructed, are secured together in spaced parallel relation one with respect to the other, and at the desired distances apart, by means of rearwardly and forwardly disposed lower cross bars 138 and 139 connecting the same substantially as is shown in Figure 5, and by means of similarly arranged upper cross-bars 140 and 141 connecting the upper ends of the posts or standards 135ª, 135ᵇ; 136ª, 136ᵇ; and 137ª, 137ᵇ; while the upper ends of the posts or standards are, in turn, connected together by the longitudinally extending bars 135ᵈ, 136ᵈ and 137ᵈ. These base frame members or castings 135, 136, and 137, together with their respective posts or standards 135ª, 135ᵇ; 136ª, 136ᵇ and 137ª, 137ᵇ, are preferably flanged or webbed, as at 142, and in a manner to be substantially T-shaped in cross-section. It is to be here noted that the transverse width of the gun supporting frame is slightly greater than that of the mount or base, so that the outer of the base members or castings 135 and 137 are disposed in planes outwardly of the planes of the standards 130, 131, and are supported in such position on the complemental ends of the pivot bar or shaft 134 projecting through the latter, while the center or intermediate base member or casting 136 is disposed substantially in the plane of the longitudinal center of the mount and is supported on the pivot bar or shaft 134 medially of the opposite ends thereof.

The turn table, together with the gun frame just described, is to be revolved in a horizontal plane throughout 360°, or a complete circular movement, by any suitable manual or power means for the purpose, and, in the present instance, a manually operated means is shown; and this means comprises a pinion or gear 143 being arranged in meshing relation with the internal gear teeth 144, formed on the inner periphery of the annular turn-table member or ring gear 124. This pinion or gear 143 is operable in a slotted opening formed horizontally through the annular rail or member 121, and is keyed on the lower end portion of a vertically disposed operating shaft 145, which is journalled at its lower end in the latter member 121 and extends upwardly through the platform flooring section 129, where its upper end portion is journalled in a bearing 146 formed at the outer end of a bracket 147 projecting rearwardly of the vertical face of a standard 148 rising vertically from and medially of the forward edge of the flooring section 129, and immediately in rear of the gun supporting frame and in alignment with the longitudinal center thereof. The upper free end of the operating shaft 145 is provided with a hand wheel 149, which is, in turn, provided with a vertically disposed hand grip 150, by means of which the desired rotary movement is imparted to the shaft 145 and consequently to the pinion or gear 143 and, in turn, to the turn-table.

For adjusting the angle of inclination of the gun supporting frame on the pivot rod or shaft 134, and through an arc of movement of 45°, more or less according to the details of design of the mount and frame, a stub shaft 151 is journalled in a bearing 152 formed at the upper end of the standard 147, which is bolted or otherwise secured as at 153, and medially of the forward edge portion of the platform floor section 129, as aforesaid. The stub shaft 151 is rotated in either direction from a hand wheel 154 keyed on its outer end, and is connected at its inner end by means of a universal joint 155 to the outer end of a screw shaft 156, which is extended through a vertical slotted opening 157, formed in the rear vertical wall of the gun frame, and is operable in a threaded sleeve or member 158 carried at the inner side of the said rear wall along which it is vertically movable correspondingly with the rotating movements of the screw shaft 156, and the tilting or swinging movements of the said gun frame.

Massed within the gun frame, in longitudinally and transversely extending rows, are a number of vertically disposed guns or rifles, forty of the same being shown in the present instance, and arranged in rows of five, one row parallel to the other in the longitudinal direction of the frame, and in rows of eight, one row parallel to the other in the transverse direction of the latter. These guns or rifles are further divided into groups of twenty each to either side of the center longitudinal frame member 136ᵇ, and in the form of five transverse rows of four each to each group of twenty, and all of the guns so arranged are to be fired and loaded simultaneously, or in the divided groups of twenty as above mentioned, or in separate rows of four each, or in any number of such latter rows as may be desired, the mechanisms for the accomplishment of such purposes is to be hereinafter more fully explained. Each of these guns or rifles comprises a vertically extending barrel 159; a magazine casing or tube 160 extending parallel to the barrel 159 and secured thereto by means of clamp bands 161; a removable magazine 162 fitted into each magazine casing or tube; and a lock casing 163 for housing the firing and reloading mechanisms thereof; the lower end of the barrel 159 and the magazine casing or tube 160 being detachably secured in the upper end of the latter, substantially as is shown in Figures 38 to 41. The lower ends of the lock casings 163 are each formed to provide extensions 164, having pivot eyes therein, and with separable portions 165 arranged in engagement on transversely extending pivot bars or shafts 166 secured against rotation in bearing lugs or the like 167, the latter being formed in equidistantly spaced relation along the upper longitudinal faces of the base frame members, 135, 136, 137, these pivot bars or shafts 166, of course, correspond in number to the five transversely extending rows of eight guns or rifles. The pivot bars or shafts 166 are preferably formed to provide equidistantly spaced spherical portions 168, which are engaged by the socket eyes formed in the said extensions 164 and the separable portions 165 thereof, whereby the guns or rifles may be varied in angular divergence one with respect to the other from their normally vertical positions, and in both of the longitudinal and transverse directions of the gun frame.

Referring now to Figures 29 to 37, inclusive, in addition to Figures 1 to 5, inclusive, the guns or rifles each extend upwardly from their pivotal connections on the pivot bars or shafts 166 and project through registering openings 169 and 170 formed in transversely and longitudinally disposed bars or beams 171 and 172, respectively, which bars or beams are supported in the desired horizontal crossed positions at the top of the gun frame, and substantially as is shown in Figure 39. The transversely extending lower bars or beams 171 are, as shown in Figures 33 and 34, each formed with a series of equidistantly spaced rectangular openings 169, through which the guns or rifles project, and a corresponding number of horizontally slotted openings 173 in the opposite vertical side walls thereof, through which the longitudinally extending bars or beams 172 are projected, the latter being of a less width than the length of the said slotted openings 173 whereby to be laterally adjustable therein. The opposite ends of these bars or beams 171 are formed to provide bearing eyes or sleeves 174 (general designation) having their bores threaded onto similarly threaded cylindrical enlargements 175 (general designation) formed with or carried by longitudinally extending shafts 176 disposed at the opposite side edges of the upper part of the gun frame, which shafts 176 are journalled in suitable bearings brackets 177 extending outwardly from the gun frame. The longitudinally disposed bars or beams 172 are formed to provide elongated slotted openings 170 arranged to register with the openings 169 of the transverse bars or beams 171, when the same are in proper position within the slotted openings 173 thereof, and also, at their opposite ends, with bearing eyes or sleeves 178 having their bores threaded onto similarly threaded enlargements 179 formed with or carried by transversely extending shafts 180 journalled in bearing brackets 181 projecting outwardly of the upper portions of the rear and front walls of the gun frame.

In their normal positions of adjustment, the openings 169 and 170 of the bars or beams 171 and 172 are registered in a manner to retain the guns or rifles in accurately disposed vertical position, wherein the cone of fire or dispersement of the same will be concentrated to the smallest area contemplated for a given design of the machine gun. However, the several guns or rifles of the outer longitudinally and transversely disposed rows thereof are angularly and oppositely adjustable outwardly from the center of the frame, and correspondingly one gun or rifle with respect to the other, whereby to effect a greater area to the cone of fire or dispersement thereof. For the accomplishment of the foregoing adjustments, the bearing sleeves 174 of the center transversely disposed bar or beam 171 and the enlargements 175 of the shafts 176 complemental thereto are unthreaded, whereby this central transversely extending row of guns or rifles are held in vertical position throughout the operation of the gun, while the bearing sleeves $174^a$, $174^b$, of the rearwardly disposed transverse bars $171^a$, $171^b$, together with the enlargements $175^a$, $175^b$ complemental thereto are threaded for right hand movement, and the bearing sleeves $174^c$, $174^d$, of the forwardly disposed transverse bars or beams $171^c$, $171^d$, together with their complemental enlargements $175^c$, $175^d$, are threaded for left handed movement, upon the desired rotary movement being imparted to the shafts 176. Similarly, the bearing sleeves $178^a$, $178^b$, $178^c$, and $178^d$, of the longitudinal bars or beams 172 of one of the sets or groups of twenty guns or rifles disposed at one side of the longitudinal center of the gun frame, are, together with the enlargements $179^a$, $179^b$, $179^c$, and $179^d$, of the transversely extending shafts 180, threaded for right hand movement of the said bars, while the bearing sleeves $178^e$, $178^f$, $178^g$, and $178^h$, of the longitudinal bars or beams $172^e$, $172^f$, $172^g$, and $172^h$, cooperative with the opposite set or group of twenty guns, are, together with the enlargements $179^e$, $179^f$, $179^g$, and $179^h$ of the said shafts 180, threaded for left handed movement upon the desired rotary movement being imparted to the latter shafts. The range of adjustment of these several transverse and longitudinal bars 171 and 172 is such that the angular divergence of the inner or centrally disposed of the guns or rifles is less than that of the outer thereof, and this is made possible by varying the pitch of the thread of the complemental pairs of bearing sleeves and enlargements, as for instance, the threads of the bearing sleeves $174^a$, $174^c$, of the transverse bars $171^a$, $171^c$, and the enlargements 175 complemental thereto, are of one and the same pitch, say 1/64 of an inch, while that of the bearing sleeves $174^b$, $174^d$, and the enlargements 175 complemental thereto, are of one and the same pitch, but greater than that of the bearing sleeves $174^a$, $174^c$, or say 2/64 of an inch. Similarly the adjacent pairs of the bearing sleeves $178^a$, $178^e$, of the longitudinal bars or beams $172^a$, $172^e$, and the shaft enlargements 179 complemental thereto, are threaded to a pitch of 1/64 of an inch correspondingly to that of the sleeves $174^a$, $174^c$, and the enlargements 175 thereof; the bearing sleeves $178^b$, $178^f$, of the intermediate longitudinal bars or beams $172^b$, $172^f$, and the shaft enlargements 179 complemental thereto, are threaded to a pitch of 2/64 of an inch; the bearing sleeves $178^c$, $178^g$, and their complemental shaft enlargements 179 to a pitch of 3/64 of an inch; and the bearing sleeves $178^d$, $178^h$, and their shaft enlargements 179 to a pitch of 4/64 of an inch. For effecting the operation of the shafts 176 and 180 whereby to effect, in turn, the desired angle of divergence of the several adjustable guns or rifles, the longitudinal shafts 176 are provided, one with a worm gear $182^a$, and the other with a worm $182^b$, arranged in mesh with a worm $183^a$ and a worm gear $183^b$, respectively, keyed on the opposite ends of a transversely disposed shaft 184, which is journalled in bearings $185^a$, $185^b$, and $186^c$, carried on the upper faces of the upper longitudinally extending frame bars or members $135^d$, $136^d$, and $137^d$. One of these shafts 176 is further provided with a worm gear $186^a$ at its rear end, which projects slightly beyond the rear vertical wall of the gun frame, and this gear $186^a$ is arranged in mesh with a worm $186^b$ carried at the outer end of an operating shaft 187, which, in turn, is journalled in bearings $187^a$, $187^b$, mounted on the said rear vertical wall of the gun frame, while a beveled gear $188^a$ is keyed on the inner end of the shaft 187 and is arranged in mesh with a beveled gear $188^b$ similarly keyed on the spindle of a hand wheel 189, the latter being positioned at a point above the horizontal center of the gun frame adjusting hand wheel 154 and to one side thereof. Similarly, the transversely disposed shafts 180 are each provided with worm gears $190^a$, $190^b$, arranged in mesh with worms $191^a$, $191^b$, carried at the opposite ends of an actuating shaft 192, which is journalled in the plane of the longitudinal center of the gun frame and in the front and rear walls thereof. The rear end of this shaft 192 is projected slightly beyond the rear wall of the gun frame, and has keyed thereon a worm gear $193^a$ arranged in mesh with a worm $193^b$ carried on an operating shaft 194, which is journalled in bearings $195^a$, $195^b$, and $195^c$, secured on the rear wall of the gun frame, the opposite end of the shaft 194 being provided with a beveled gear $196^a$, which is arranged in mesh with a second beveled gear $196^b$ carried on the spindle of a hand wheel 197, the latter being disposed in a horizontal plane of the hand wheel 189 at the opposite side of the gun frame adjusting wheel 154.

Referring now to the gun or rifle constructions, as herein before generally referred to, the lock casings 163 are substantially rectangular in cross section and are elongated in the vertical direction from their lower pivoted ends, and have their upper end walls each formed to provide threaded openings $198^a$ and $198^b$, into which the lower ends of the barrels 159 and of the magazine casings or tubes 160 are threaded, substantially as is shown in Figures 38 to 43, inclusive, 49, 61 and 63. The magazines 162 to be fitted downwardly of the casings or tubes 160 are of tubular form open at their lower ends and closed at their upper ends by means of enlargements 199, which are preferably knurled as at 200. As shown in Figures 58 to 63, inclusive, the lower open ends of the magazines 162 are split longitudinally to provide diametrically opposed resilient tongue members $201^a$, $201^b$, which are thickened at their free ends to provide shouldered portions $202^a$, $202^b$, of a formation snugly conforming to the form of the grooves 203 in the peripheral wall of practically all types of small arms cartridges, designated generally as at 204. These tongues $201^a$, $201^b$, are normally sprung outwardly of the walls of the magazines, so that the inner extremities of the shouldered portions $202^a$, $202^b$, lie substantially flush with the inner surfaces of the bores thereof, when the cartridges 204 are being inserted into the open ends of the same, the magazines being withdrawn from the casings or tubes 160 and inverted end for end for such purpose. After the magazines 162 have been filled with cartridges to a desired degree, or completely so, locking collars 205, loosely encircling the magazines and slidable thereon, are drawn into engagement with the tongues $201^a$, $201^b$, and force the same inwardly of the walls of the latter, so that the shouldered portions $202^a$, $202^b$, engage the groove 203 of the lowermost cartridges, substantially as shown in Figure 58. With the magazines thus filled, the open ends of the same are inserted into the upper open ends of the casings or tubes 160, and are then lowered into operative position. In the initial downward movement of the magazines 162 within the casings or tubes 160, the locking collars 205 are engaged by the upper open ends of the latter, and act to release the tongue 201ª, 201ᵇ, which are, however, still held in their cartridge retaining positions by reason of their engagement of the inner surfaces of the casings or tubes 160, and are only released from such retaining engagement, when the open ends of the magazines 162 have reached the lower ends of the threaded bores of the lock housings 163, in which the lower ends of the magazines 162 are engaged, and which are formed to provide concentrically arranged annular recesses 206, whereby to permit of the springing of the tongues 201ª, 201ᵇ, outwardly into the same, which action fully releases the cartridges for purposes of being transferred singly from the magazines 162 to the breech portions 159ª of the gun barrels 159. It is to be here noted that the locking collars 205 are preferably knurled as at 205ª to facilitate the manipulation of the same to locking positions. The lower open ends of the magazines 162 are further split longitudinally to provide single tongue portions 207 arranged in substantially right angular relation to the tongues 201ª, 201ᵇ, or spaced at 90° therefrom, and these tongues are thickened at their free ends to form outwardly directed shouldered portions 208, which act to prevent the locking collars 205 from being accidentally displaced or removed from their encircling engagement on the magazines 162, and have their lower free edges beveled to facilitate the proper and unobstructed insertion of the lower open ends of the magazines 162 into the upper open ends of the casings or tubes 160, the inner edges of the bores of the latter being also beveled as at 209 for such purpose. Pivotally mounted as at 210 within each of the lock casings, is a cartridge transfer or carrier device comprising a lower arm portion 211 and a pair of spaced parallel intermediate arm portions 212ª, 212ᵇ, disposed in angular relation with respect to the arm portion 211, and carried at the upper ends of these arms 212ª, 212ᵇ, is a cartridge receiving and supporting portion 213 having a rearwardly inclined side wall 214, which is slightly curved as at 215, and inwardly at its upper end, whereby to contact the upper intermediate portion of a cartridge positioned thereon. The arms 212ª, 212ᵇ, are normally disposed in substantially vertical position, so that the cartridge receiving and supporting portion 213 is held in a horizontal position in a plane below and in line with the lower open ends of the magazines, whereby the lowermost of the cartridges 204 will be discharged singly thereon, and, during the movement of the transfer or carrier, the cartridge on the latter, will rest against the wall 214 thereof, substantially as is shown.

Extending forwardly from one side of the wall 214 is an arm 216, the purpose of which, together with that of the arm 211, will be hereinafter more fully explained. Mounted in each of the lock casings 163, immediately in front of the cartridge carrier devices, and in line with the breech 217 of the bores of the barrels 159, is a vertically operable firing mechanism which comprises a bolt member 218 having a longitudinal bore 219 therein, in which is slidably mounted a plunger 220, the latter having a firing pin 221 extending upwardly of its inner end, which is projected outwardly of an opening 222 formed in the upper closed end of the bore 219, when the plunger 220 is released for the firing operation. The rear wall of the bolt member 218 is slotted, as at 223 throughout practically its entire length for its clearance of the several operating parts of the loading and firing mechanisms, in its movements to and from operative position, while the firing plunger 220, within the same, is movable to firing position under the action of a coiled spring 224, which has its adjacent end fitted over and connecting a stem portion 225 projecting from the lower end thereof, and its opposite lower end fitting over and secured to the reduced portion 226 of a post 227 disposed vertically within the lock casings 163 and secured at its lower and reduced threaded ends 228 in an opening 229 formed in the bottom wall of the latter in line with the bore of the bolt 218. The firing plunger 219 is formed to provide an annular shouldered portion 230, which, when the bolt 218 is forced downward to its lowest position for the ejection of the empty shell of the fired cartridge outwardly of the opening 231 provided for such purpose, and under the action of a resilient extractor 232 carried thereby, is engaged by a latch or sear 233 projecting in the path of the plunger 219 and through the slot 222 of the bolt 218. This latch or sear 233 is pivoted on a pivot pin 234, which projects laterally from one side of the lock casing 163 and carries on its outer end a downwardly inclined trigger arm 235, which is engaged by a trip arm 236 for its proper actuation. Associated with the cartridge transfer or carrier is a cartridge retaining device comprising a substantially Y-shaped member, which is pivoted as at 237 to the walls of the lock casing 163, and has its lower arm 238 extending to a position below the lower end of the sliding bolt 218 and in the path of the downward movement thereof, when the latter is in its raised position. The upper and rearwardly disposed arm 239 of the retaining device has its free end angularly bent to provide a seat portion 240, which, during the transfer of the first of the lowermost cartridges 204 from the lower end of a magazine 162 by the carrier to the breech 217 of the gun barrel 159, is movable to a position where the seat portion 240 is disposed beneath the lower end of the next lowermost cartridge, and acts to support the same together with the remaining cartridges 204 within the magazine, and prevents the same from falling or being discharged downwardly of the latter. The transfer device, and the cartridge retaining device, are moved to and held in their normal positions, as shown in Figures 38 and 39 by means of upwardly and forwardly directed arms 216 and 239ª being contacted by the bolt 218 when the same is in its upper or firing position, and upon its downward movement to shell ejecting position, the lower end of the bolt 218 first strikes the arm 238 of the cartridge retaining device and moves the seat portion 240 thereof into position under the lowermost of the cartridges within the magazine, assuming that the first lowermost cartridge has already been dropped into position on the seat portion 213 of the transfer or carrier device, the forwardly projecting arm 239ª being moved to a position in the path of the returning or upward movement of the bolt 218. Further downward movement of the bolt 218 causes the lower end thereof to strike the arm 211 of the transfer or carrier device, and causes the same to swing on its pivot 210, so that the upper end thereof is moved to a position where the upper end of a seated cartridge will be directed towards the opening of the breech 217 of the gun or rifle barrel 159. Upon the upward movement of the bolt 218, the upper end of the same engages the lower end of the cartridge on the transfer or carrier device, and forces the same upwardly into the breech 217, during which movement the bolt first strikes the arm 216, of the transfer or carrier device, and swings the same backward on its pivot 210 to normal cartridge receiving position, and then on its final upward movement strikes the arm 239ª of the cartridge retaining device, causing it, in turn, to swing backwardly on its pivot 237, whereupon the lowermost cartridge 204 within the magazine is released and dropped downwardly into position on the seat portion 213 of the transfer or carrier device, the next lowermost of the cartridges resting on the upper end of the latter cartridge until it, and the remaining cartridges within the magazine, are again supported on the seat portion 240 of the cartridge retaining device.

For effecting the loading of all of the guns or rifles simultaneously, or in separate groups, or in separate rows of such groups, the sliding bolts 218 of each are formed with an offset portion or extension 241 projecting outwardly of the shell ejecting opening or vertical slotway 231 and from the outer end of which is provided a depending arm 242 lying substantially parallel to the outer vertical wall of the lock casings 163. The lower ends of these depending arms 242 have their inner edges formed to provide racks 243 disposed in mesh with complemental gears 244 loosely mounted on shaft sections 245 (general designation) disposed transversely of the gun frame and journalled in bearing brackets 246 formed at the lower ends of the lock casings 163. When in firing position, the firing bolts 218 are each locked in such position by means of a locking bar 247, which is pivoted at its upper end, as at 248, to the upper inner edge portion of the depending arm 242, and has a locking lug 249 formed on its outer face, at a point substantially intermediate the ends thereof, which is normally forced into engagement with the lower edge of the cartridge shell ejecting opening 231, by means of a spring 250, which is interposed between the opposed faces of the depending arm 242 and the locking bar 247, immediately below the pivotal point of the latter with the former. For effecting the release of the locking bar 247, to admit of the actuation of the firing bolts 218, each of the several gears 244 have disposed at one side thereof a detent 251, which, upon the initial turning movements thereof, engage the lower free ends of the locking bars 247 and force the same outwardly against the tension of the springs 250, and free the locking lugs 249 thereof from their engagement with the end walls of the openings or slots 231. These detents 251 are housed in integral portions 252 extending tangentially of the hub portions 253 keyed on the shaft sections 245, and are tensioned outwardly of the housings 252 by means of springs 254, substantially as is shown in Figures 46 and 47, suitable slots 255 being formed in the opposite walls of said housings for the reception of pin projections 256 carried at the opposite sides of the detents 251, and cooperating together to limit the movement of the latter within the housings. These hubs 253 are, as shown in Figures 47 and 48, in the form of clutch elements having end clutch portions or fingers 257 and 257ª engaged in complemental clutch recesses 258, 258ª, formed in the adjacent ends of the hubs of the gears 244, whereby the latter do not rotate until after the initial unlocking movement of the detents 251, and the locking bars 247 have had their lugs 249 entirely freed from their locking position, as aforesaid.

As has been hereinbefore explained, the guns or rifles are massed together in two parallel groups of twenty guns or rifles each, and each of these groups are composed of five rows of four guns or rifles each, the rows of one group being in alignment with the corresponding rows of the other thereof, and correspondingly, each of the several rows of each group have associated therewith a shaft section 245, as hereinbefore mentioned, the shaft sections of the rows of one group being disposed in alignment with the shaft sections 245 of the other of such groups, the adjacent ends of the several pairs of such shaft sections being disposed in close relation one with respect to the other, substantially as is shown in Figure 11. Mounted loosely on the adjacent ends of each pair of the shaft sections 245 are gears 259 (general designation) having the opposite ends of their hub portions formed to provide toothed clutch portions 260, which have cooperative therewith clutch elements 261, 262 (general designation) one slidably keyed or splined on its complemental shaft section 245. The several gears 259 are all operable simultaneously through the medium of a rack bar 263, which is formed with toothed rack sections 264, one for each gear, substantially as is shown in Figures 4 and 6, the rack bar 262 being, in turn, operable through the medium of a connecting rod 265 from a hand lever 266, the connecting rod 265 being pivoted as at 267 to the rack bar 262 and as at 268 to the hand lever, the latter being, in its turn, pivoted as at 269 in a bracket 270 secured at the lower edge of the rear wall of the gun frame. With the movable clutch members 261, 262, in unclutched relation with respect to the gears 259, any attempted manipulation of the hand lever 266 will only result in the free reciprocation of the rack bar 263, and similar rotation of the gears 259, and to effect the manipulation of the several clutch elements 261, 262, to operative position with respect to the said gears, each of the clutches are independently operable through the medium of clutch yokes 271 carried on vertically disposed rods or shafts 272, which are journalled at their lower ends in bearings 273 carried on the upper face of the center longitudinal frame bar or beam 136, and are extended upwardly through the plate or bar $136^d$ extended between the upper edges of the front and rear walls of the gun frame, and on the longitudinal center thereof. Journalled at its opposite ends in bearings 274—275, which are carried by the front and rear walls of the gun frame, and extending in a plane above the plate or bar $136^d$, is a cam shaft 276 on which is carried a series of cam elements 277 (general designation), which are arranged to cooperate with lever arms 278 carried at the upper free ends of the vertical shafts 272, the cam elements being arranged in sets, one corresponding to and cooperating with the loading shafts 245 of, for instance, the left hand group of twenty guns or rifles, and the other set with the loading shaft sections 245 of the right hand group of twenty guns or rifles. The individual cam elements 277 are arranged in pairs $277^a$, $277^b$; $277^c$, $277^d$; $277^e$, $277^f$; $277^g$, $277^h$; and $277^i$, $277^j$; the elements $277^a$, $277^c$, $277^e$, $277^g$, and $277^i$ forming the right hand set, and the elements $277^b$, $277^d$, $277^f$, $277^h$, and $277^j$, the left hand set, and are so displaced, the individual elements of each set, that the right hand set are operable for the progressive actuation of the lever arms 278 and the loading mechanisms of the right hand group of guns or rifles controlled thereby, upon a rotary movement being imparted to the shaft 276 in an anti-clock-wise direction, and similarly the left hand set for the progressive actuation of the lever arms 278 and the loading mechanisms of the left hand group of guns or rifles controlled by the same, upon a reversed or clock-wise movement being imparted to the shaft 276. Cooperative with the cam operated shafts $272^a$, $272^b$, $272^c$, $272^e$, $272^f$, $272^g$, $272^h$, $272^i$, and $272^j$, and disposed on the underside of the bar or plate $136^d$, is a locking mechanism comprising a series of locking members or dogs $279^a$, $279^b$; $279^c$, $279^d$; $279^e$, $279^f$; $279^g$, $279^h$; $279^i$, $279^j$, which are pivoted as at $280^a$, $280^b$, and have cooperative therewith a corresponding number of locking levers or arms $281^a$, $281^b$, $281^c$, $281^d$, $281^e$, $281^f$, $281^g$, $281^h$, $281^i$ and $281^j$, carried by the vertical shafts $272^a$, $272^b$, $272^c$, $272^d$, $272^e$, $272^f$, $272^g$, $272^h$, $272^i$, and $272^j$, respectively, the dogs $279^a$, $279^c$, $279^e$, $279^g$ and $279^i$, being tensioned by springs $280^c$ in one direction or forwardly of the bar or plate $136^d$, and the dogs $279^b$, $279^d$, $279^f$, $279^h$ and $279^j$ by springs $281^d$ in the opposite direction or rearwardly of the bar or plate $136^d$. For releasing these dogs 279 (general designation) from their locked position of operation, a longitudinally disposed rod 282 is arranged beneath the bar or plate $136^d$ and has its rear end projected outwardly of the rear wall of the gun frame, where it terminates in an operating handle 283, a coil spring 284 being provided and interposed between a supporting bearing 285 and the rear angularly bent end 286 of the bar or plate $136^d$ for retaining the rod 282 in normally inoperative position. This rod 282 is supported in bearings 287, other than the bearing 285, and is provided with a series of spaced pins $288^a$, $288^b$, $288^c$, $288^d$, $288^e$, $288^f$, $288^g$, $288^h$, $288^i$, and $288^j$, and for each of the dogs $279^a$, $279^b$, $279^c$, $279^d$, $279^e$, $279^f$, $279^g$, $279^h$, $279^i$, and $279^j$, the purpose and mode of operation of which will be hereinafter more fully explained.

The rear end of the cam shaft 276 is projected centrally through a dial plate 289 rising medially of the top edge of the rear wall of the gun frame, and has fixed on its free end a hand crank or control lever 290, which is movable over the dial plate 289 in either of a right handed or left handed direction, substantially as is shown in Figure 12, from its normal zero position at the lower end of the vertical center thereof, a stop flange or lug 291 being arranged at the top edge of the dial plate to prevent a complete revolution to the same. Marked along the facial edge of the dial plate 289, to the right and left of the lower zero position of the control handle 290, are numerals 1 to 5, inclusive, one for each of the respective rows of guns or rifles of each of the right and left hand groups thereof, and the control crank or lever 290 is movable to register with these numeral indications, for the setting of the loading mechanisms of the corresponding rows of guns or rifles, and of the groups as aforesaid. The control crank or lever 290 is provided with a hand grip 292 in which is operable a push button or plunger 293 for manipulating a spring tensioned locking pin or the like 294 normally engaging in openings 295 formed in the dial plate 289 for retaining the crank 290 in any of its positions of operation or rest, one of these openings 295 being located immediately adjacent each of the zero and operative points or indications on the dial plate 289.

In the operation of the loading mechanisms as a whole, and of the individual loading mechanisms of the several guns or rifles, and, if it is desired to load all of the same at one time, it being assumed that the several magazines 163 have been filled and placed in position within their respective casings or tubes 160, the control crank or hand lever 290 is unlocked from its zero position by the pressing inward of the button or plunger 293 in the hand grip 292 thereof for the withdrawal of the spring tensioned locking pin 294 from the opening 295 at the zero point on the dial face 289, and is moved, first to the right, and then back to zero position and to the left over the dial face, or vice versa, to and in alignment with all of the opposite sets of indicating numerals thereon, when the right turning movement of the cam shaft 276 will cause the cam members 277 thereof to actuate the levers or arms 278 for the rotation of their respective vertical shafts 272 at the right hand side of the bar or plate 274. The rotation of these shafts 272 will swing the clutch yokes 271 at the lower ends thereof for the throwing of the several clutches 261 into engagement with the clutch ends of the hubs of the gears 259 at the right hand side thereof, and the shafts 272 will be held against retrograde movement by the dogs 279 being sprung into engagement with the levers or arms 281 carried on the shafts 272 and complemental thereto. Similarly, the left hand turning of the cam shaft 276 will effect the actuation of the other set of vertical shafts 272, through the medium of their complemental cams and actuating levers or arms 278, at the left of the bar or plate 274 for the throwing of the clutches 262 into engagement with the left ends of the hubs of the gears 259, when the opposite loading shaft sections 245 of the right and left hand groups of guns or rifles will be coupled together and to the gears 259, when the operator of the machine gun will grasp the hand lever 266 and will pull the same in a rearward direction, which motion will move the rack bar 263 rearwardly and impart a rotary movement simultaneously to all of the gears 259, and the shaft sections 245 coupled thereto. The initial rotating movement of the shafts 245 will rotate the detent clutch members 253 and cause the detents 251 thereof to engage the lock bars 247 and snap the same outwardly of their locked positions with respect to the slotted openings 231 of the lock casings 163, when, upon the further rotation of the shafts 245 and the detent clutch hubs 253, the latter will engage with the gears 244 and rotate the same in engagement with the racks 243 of the firing bolts 216, whereby the latter are pulled downwardly. This downward movement of the bolts 216, compresses the coil springs 224 of the firing plungers 220, and causes the latter to be engaged by the sears 233 for being maintained in position for subsequent firing action. This downward movement of the bolts 216, also effects the movement of the cartridge transfer or carrier device, and the cartridge retaining device, as has been hereinbefore described, and to the position as shown in Figure 40. The operator now pushes the hand lever 266 in a forward direction, and thereby causes the rack bar 263 to rotate the gears 259 in a reverse direction from that as in the first instance, wherein the shaft sections 245 will also be rotated in the reverse direction, together with the detent hubs 253 and the gears 244 coupled thereto, when the latter will, through their meshing relation with the racks 243, force the bolts 216 upwardly of the lock casings 163 to normal firing position, each bolt 216 forcing into the breech of the respective gun or rifle barrel 159 the cartridge 204 being then supported on the transfer or carrier devices and in proper position for such purpose. However, should it be the desire of the operator to load only one group of the guns or rifles at one time, the hand crank 290 need only be moved correspondingly to the left or right for the purpose, and brought back to its zero position, or left locked in the upper of either of the locking openings 295 opposite the fifth of the indicating numerals, when the shaft sections 245 of the particular group selected will be clutched to the gears 259 for operation by the rack bar 263, when, upon the manipulation of the latter, as in the first instance, the loading operation will be accomplished. Upon rotary movement being imparted to the rotary shaft 272 and the several arms or levers 281 carried thereby, the latter are swung to positions clear of the operative ends of the dogs 279 complemental thereto, when the dogs 279 will swing on their pivots 280 to positions wherein their operative ends engage behind the arms or levers 281 and hold the vertical shafts 272, together with the clutch members operated thereby, in locked operative position. After the actuation of the hand lever 266 for effecting the loading operation as hereinbefore described, the dogs 279 are to be released from their engagement with the arms or levers 281, by means of the rod 282, which is pulled in a rearward direction by the operator grasping the hand grip 283 thereof, when the several pins 288 on the rod 282 will engage dogs 279 and force the operative ends of the same to position allowing for the clearance of the free ends of the arms or levers 281 in their return movements to normal position, which latter movement is accomplished by coil springs 296 surrounding the vertical shafts 272 and having one of their ends secured thereto and the others thereof secured as at 297 to the upper face of the longitudinal bar or plate 274. With the retrograde movement of the vertical shaft 272 and the arms or levers 281 thereon, to normally inoperative positions, under the action of the springs 296, the clutch elements 261, 262, are withdrawn from their operative engagement with the loading gears 259. Correspondingly with the foregoing, each row of the four guns or rifles of each right and left hand group thereof may be loaded separately in their sequence from the rear of the gun frame forwardly thereof, or any odd or even number of such rows of both groups of the same may be so loaded, and this is to be readily accomplished by first manipulating the control handle or crank 290 either to the right or left on the dial plate 289, or first in one direction and then in the other thereof, to the desired numerical indications, corresponding to the number of rows, selected for loading, when the shaft 276 will be correspondingly rotated and the cams thereon will accomplish the actuation of the vertical shafts 272 complemental to the rows of guns or rifles selected for the loading operation, when the locking dogs 279 of the shafts only will be effected, as well as the clutch elements 261, 262 thereof. As specific instances of this individual operation of the loading of selected rows of guns or rifles, and assuming that it is desired to load the first rearwardly disposed row of four guns or rifles of the right hand group thereof, the control handle or crank 290 is moved to the numeral 1 indication to the right hand side of the dial plate 289, when the cam shaft 276 will be rotated sufficiently to move the cam element 277$^a$ for the actuation of the arm or lever 281$^a$ and for the rotation of the vertical shaft 272$^a$, the rotation of the latter causing the desired movement of the yoke arm 271$^a$ carried thereby to, in turn, actuate the complemental clutch element 261 thereof into engagement with the loading gear 259$^a$. With the rotation of this vertical shaft 272$^a$, and the resultant swinging movement of the arm or lever 281$^a$ clear of the locking dog 279$^a$, the latter will move under the tension of the spring to locking position in rear of the arm or lever 281$^a$. Now, with the right hand side of the loading gear 259$^a$ clutched to the loading shaft section 245$^a$, upon the actuation of the loading hand lever 266, only the gear 259$^a$ and the shaft section 245$^a$ will be rotated under the reciprocation of the rack bar 263, and consequently, the loading operation will obtain only in the selected row of guns or rifles. Similarly, if it is desired to load the first row of the left hand group of guns or rifles at the same time as the loading of the first row of the right hand group is accomplished, upon the completion of the movement of the control lever or crank 290 to the numeral 1 indication at the right of the dial plate 289, the same is immediately returned to zero position and over to the numeral 1 indication at the left of the dial plate 289, when the reversed rotation of the shaft 276 will move the cam 277$^b$ for the actuation of the vertical shaft 272$^b$ and its associated parts to operative position as in the first instance, when the loading gear 259$^a$ will be clutched to both loading shaft sections 245$^a$, 245$^b$, and upon the operation of the loading lever 266, the rack bar 263 will rotate the gear 259$^a$ and through its clutched condition effect the loading of the first rows of each of the right and left hand groups of guns or rifles. To properly offset the manually operated loading lever 266$^a$ to a position at one side of the standard 148 for the easy access thereto of the operator of the machine gun, the same is preferably mounted at one end of a shaft section 298 journalled in brackets 299$^a$, 299$^b$, secured at the lower edge of the rear wall of the gun frame, substantially as is shown in Figures 2, 3 and 12, and the loading lever proper 266 is secured to the shaft 298 at the opposite end thereof and directly in rear of the standard 148.

For effecting the firing of the guns or rifles in their entirety, or by right and left hand groups, or by indivdual rows of either or both of the said groups, each of the several rows of each right and left hand group are provided with firing shaft sections 300 (general designation) extending parallel to the gun or rifle supporting shafts 166 and the loading shaft sections 245, and at the side of the shafts 166 opposite to that opposed by the shaft sections 245. The firing shaft sections 300 of each pair of aligning rows of guns or rifles of the right and left hand groups thereof are respectively designated 300ª, 300ᵇ, 300ᶜ, 300ᵈ, 300ᵉ, 300ᶠ, 300ᵍ, 300ʰ, 300ⁱ, and 300ʲ, the shaft sections 300ª, 300ᶜ, 300ᵉ, 300ᵍ, and 300ⁱ being complemental to the right hand group, and the sections 300ᵇ, 300ᵈ, 300ᶠ, 300ʰ and 300ʲ to the left hand group substantially as is shown in Figure 4, and each of these shaft sections are provided with lever arms 301ª, 301ᵇ, 301ᶜ, 301ᵈ, 301ᵉ, 301ᶠ, 301ᵍ, 301ʰ, 301ⁱ, and 301ʲ, respectively, the lever arms 301ª, 301ᶜ, 301ᵉ, 301ᵍ, 301ⁱ being disposed in staggered relation one with respect to the other, the lever arms 301ª at the inner end of the shaft sections 300ª, and the others on their respective shaft sections outwardly from the inner ends thereof in a manner that their positions are disposed in alignment with the spaces between the outer longitudinal rows of guns or rifles and the lever arms 301ᵇ, 301ᵈ, 301ᶠ, 301ʰ and 301ʲ are similarly arranged on their respective shaft sections of the left hand groups of guns or rifles. Mounted on the several shaft sections 300 of each group of guns or rifles, are a second set of lever arms 236, which are arranged to bear on the trigger arms 235 of the complemental guns or rifles, whereby when the firing shafts 300 are rocked in their bearings 302, the triggers 235 will be actuated in a manner to cause the release of the sears 233 from the firing plungers 220 within the lock casings 163 when the latter will be actuated by the tension of the coil springs 224 to the upper ends of the bores of the bolts 218 for the striking of their firing pins 221 against the priming caps of the cartridges 204 positioned within the breeches 217 of the gun or rifle barrels 159. For the selective firing of the several rows of guns or rifles of each group thereof, a main firing shaft 303 is journalled in bearings 304ª, 304ᵇ, and 304ᶜ, transversely of the lower rear portion of the gun frame, and loosely mounted on this shaft 303 are a series of lever arms 305ª, 305ᵇ, 305ᶜ, 305ᵈ, 305ᵉ, 305ᶠ, 305ᵍ, 305ʰ, 305ⁱ, and 305ʲ, which are respectively complemental to and connected by means of rods or bars 306ª, 306ᵇ, 306ᶜ, 306ᵈ, 306ᵉ, 306ᶠ, 306ᵍ, 306ʰ, 306ⁱ, 306ʲ, to the lever arms 301 of the firing shaft sections 300. The lower peripheral faces of the portions of the lever arms 305, engaged on the main firing shaft 303, are grooved longitudinally as at 307 and normally engaged in these grooves 307 are locking lugs 308 formed on the upper faces of a series of blocks 309, the latter corresponding in number to that of the lever arms 305, and are carried on squared shaft or rod sections 310ª, 310ᵇ, the latter being disposed one in alignment and in end to end abutting relation with respect to the other, and in a plane parallel to and below the main firing shaft 303, and are mounted for opposite transverse sliding movement with respect to the latter shaft in bearings 304ª, 304ᵇ, and 304ᶜ, the blocks 309ª, 309ᶜ, 309ᵉ, 309ᵍ, and 309ⁱ being complemental to and cooperative with the lever arms 305ª, 305ᶜ, 305ᵉ, 305ᵍ, and 305ⁱ, and the blocks 309ᵇ, 309ᵈ, 309ᶠ, 309ʰ, and 309ʲ, to the lever arms 305ᵇ, 305ᵈ, 305ᶠ, 305ʰ and 305ʲ. The several blocks 309 are secured in properly spaced relation on the bars 310ª, 310ᵇ, and with their lugs 308 normally engaged in the grooves 307 of the lever arms 305, whereby the latter are locked against turning movement on the main firing shaft 303. Splined as at 311 for sliding movement on the main firing shaft 303, one complemental to each of the lever arms 305, are clutch elements 312 (general designation), which are arranged for cooperation with the opposed clutch faces of the lever arms 305, and which are tensioned by coil springs 313 interposed between the same and a series of collars 314, also mounted on the shaft 303. The clutch elements 312 are normally held from engagement with the clutch faces of the lever arms 305 by means of peripheral lugs 315 formed therewith and disposed in abutting relation with respect to the inner faces of the blocks 309. The bars 310ª, 310ᵇ, each have their rear side faces formed to provide racks 316, with which are meshed pinions 317ª, 317ᵇ, keyed on the lower end portions of vertically disposed shafts 318ª, 318ᵇ, which are journalled at their lower and upper ends in bearings 319 secured in position on the gun frame. These shafts 318ª, 318ᵇ, are disposed one to either side of the vertical center of the rear wall of the gun frame, and inwardly thereof, and carry at their upper ends beveled gears 320ª, 320ᵇ, respectively, arranged in mesh with complemental beveled gears 321ª, 321ᵇ, mounted on the inner ends of stub shafts or spindles 322ª, 322ᵇ, journalled in bearing brackets 323 at the upper edge of the rear wall of the gun frame, and which project rearwardly thereof. These rearwardly projected ends of the shafts or spindles 322ª, 322ᵇ, extend through openings formed for the purpose in the center of a pair of dial plates 324ª, 324ᵇ, rising vertically of the top edge of the rear wall of the gun frame, and secured thereon are hand cranks or firing control handles 325ª, 325ᵇ. The faces of each of the dial plates 324ª, 324ᵇ, have their peripheral edges marked with the numeral indications 1 to 5, inclusive, the right hand dial 324ª in a manner to correspond to the firing mechanisms of the five rows of guns or rifles in the right group thereof and in the sequence of the rows from the rear to the front of the gun frame, and the left hand dial 324ᵇ similarly marked to correspond to the firing mechanisms of the left hand group. Each of the manually operated firing control cranks 325ª, 325ᵇ, are provided with handles 326ª, 326ᵇ, in which are mounted button headed plungers 327 for the release operations of the locking levers 328 which are normally held in locked position in openings 329 formed in the dials 324ᵃ, 324ᵇ, opposite to the zero and numeral indications thereof, by means of spring elements 330, substantially as is shown in Figures 21, 22, and 23. Mounted on the main firing shaft 303 is a manually operated firing lever 331 by means of which the actual firing of the guns or rifles is accomplished, and accordingly with the predetermined setting of the several firing mechanisms.

In the operation of the firing of the guns or rifles, either all at one time, or by right and left hand groups, or by individual rows of such groups, or any desired or predetermined number of the rows thereof, and, in the first instance, the operator of the machine gun will grasp the hand cranks 325ᵃ, 325ᵇ, press the button plungers 327 therein for the release of the locking devices from their locked zero positions, when each of the cranks will be turned to registering positions with respect to the numeral 5 indications on the dials 324ᵃ, 324ᵇ, which turning movement of the cranks will rotate their respective spindles or shafts 322ᵃ, 322ᵇ, and through the medium of the beveled gears, the vertical shafts 318ᵃ, 318ᵇ. The rotary movements of the pinions 317ᵃ, 317ᵇ will, through their meshing relation with the racks 316 of the bars 310ᵃ, 310ᵇ, force the latter outwardly in opposite directions one from the other, when the respective blocks 309ᵃ, 309ᵇ; 309ᶜ, 309ᵈ; 309ᵉ, 309ᶠ; 309ᵍ, 309ʰ; and 309ⁱ, 309ʲ will have their lugs 308 disengaged from the grooves 307 of the lever arms 305, and in their movement forwardly of the lugs 315 of the clutch elements 312, the coil springs 313 will expand and force the latter into engagement with their respective clutch levers 305, which will effect the coupling of all of the firing mechanisms of the several rows of each of the right and left hand groups of the guns or rifles to the main firing shaft 303. Now, the operator will grasp a single firing lever 332 mounted on the main firing shaft 303, to one side of the loading control lever 266ᵃ, and will pull the same for the rocking of the latter shaft, which movement will, in turn, effect the pulling action on the lever arms 305, and, through the connecting rods 306, the lever arms 301 on the individual row firing shaft sections 300, and force the lever arms 302 against the triggers 235, whereby the sears 233 are released from the firing plungers 220 for the firing action of the latter under the expansion of the springs 224 within the lock casings 163. In the firing of the guns or rifles by right and left hand groups, or vice versa, the operator will grasp the desired crank 325 and turn the same to the numeral 5 indication on its respective dial 324, and this will effect the coupling of the selected group of firing mechanism to the main firing shaft 303, when, upon the pulling of the firing lever 332, the desired guns or rifles will be fired, the firing mechanisms of the other group of guns or rifles being unaffected since their lever arms 305 remain in unclutched state with respect to the main firing shaft. In the firing of a single row of the guns or rifles of either group thereof, and in the instance of the right hand group, the operator will grasp the right hand crank 325ᵃ, and will turn the same to the numeral 1 indication on its respective dial 324ᵃ, which will rotate the pinion 317ᵃ, and cause the same to move the rack bar 310ᵃ outwardly a distance sufficiently only to cause the lug 308ᵃ of the block 307ᵃ to be disengaged from the groove of the lever arm 305ᵃ, when the clutch element 312ᵃ will be forced by its coil spring 313ᵃ into engagement with the lever arm 305ᵃ for the coupling of the same to the main firing shaft 303, so that, upon the manipulation of the firing lever 332, only the firing shaft section 300ᵃ will be effected by the turning movement imparted to the main firing shaft 303, and the first of the rearwardly disposed row of four guns or rifles of the right hand group of the latter will be fired. From the foregoing it be readily apparent that one or more rows of the guns or rifles of either right and left hand groups, or both, may be fired with equal facility, and that, in any instance, the reloading of the same may be easily accomplished as has been hereinbefore set forth.

In addition to the foregoing, the invention contemplates the provision of a suitable sighting or aiming device 333, whereby through proper manipulation of the hand wheels 149 and 154, the gun as a unit can be readily and quickly brought to bear upon its target, and, by reason of the relatively great area of the cone of fire or dispersion of the several massed guns or rifles, it is reasonably assured that the gun will be effective on its target. Also, it is contemplated to provide a casing 334 extending under the bottom of the gun frame, whereby to catch and retain therein the empty shells as they are ejected from the several lock casings 163 of the individual guns or rifles 159, and one section 335 of this casing is hinged as at 336 so that the shells may be discharged from the casing, when desired. If desired, the machine gun as a whole may be enclosed with any suitable protective housing 337 which is formed to provide a pair of reversely inclined roofing sections 338ᵃ, 338ᵇ, which are hinged as at 339 to the opposite side walls thereof, and are operable to upwardly and outwardly open positions out of the line of fire of the gun by means of segmental racks 340ᵃ, 340ᵇ, respectively, and in mesh with pinions 341ª, 341ᵇ, on the shaft 342 of the pinion 341ª of which is mounted a sprocket 343 having a sprocket chain connection 344 to a second sprocket 345, the latter being carried on a spindle 346, which is operable by means of a hand crank 347 to effect the opening and closing movements of the roofing sections. A pawl and ratchet mechanism 348 is arranged in cooperative relation with respect to the spindle 346, so that the operating mechanism of the roofing section 338ª, 338ᵇ, may be held in any of its desired positions of operation.

From the foregoing, it will be readily apparent and is to be well understood that, while a preferred embodiment of the anti-aircraft machine gun has been described and illustrated herein in specific terms and details of construction, arrangement, and operation, various changes in and modifications of the same may be resorted to without departing from the spirit of the invention, or the scope of the claims appended hereto.

Having thus fully described the invention, what is claimed, is:—

1. An anti-aircraft machine gun comprising a mount, a plurality of longitudinally extending rows of vertically disposed gun barrels pivoted on end on said mount and arranged in transverse spaced relation, inter-engaging longitudinally and transversely extending shiftable supporting elements for said gun barrels, and means for shifting certain of said elements for varying the angle of divergence of certain of said gun barrels with respect to the others.

2. A machine gun comprising a mount, a turn table carried thereby, a gun frame mounted on said turn table, a plurality of longitudinally extending rows of vertically disposed gun barrels pivoted on end to said frame and arranged in transverse spaced relation, longitudinally and transversely extending shiftable supporting elements carried by said frame and surrounding said gun barrels, means carried by the frame for shifting said elements for varying of the angle of divergence of said gun barrels, means for revolving said turn table, and means for varying the angle of elevation of said gun frame and the barrels carried thereby.

3. A machine gun comprising a mount, a turn table carried thereby, standards mounted in spaced relation on said turn table, a gun frame pivotally mounted on said standards, a plurality of longitudinally extending rows of vertically disposed gun barrels pivoted on end to said frame and arranged in transverse spaced relation, shiftable supporting elements carried by the frame and having said barrels extending therethrough, means for shifting said elements for varying the angle of divergence of certain of said gun barrels with respect to the others, means for revolving said turn table, and means for adjustably tilting said frame on its pivot connections for varying the angle of elevation thereof and of the gun barrels.

4. A machine gun comprising an adjustable gun frame, sets of vertically disposed gun barrels pivoted on end to said frame and arranged in transverse spaced relation, inter-engaging longitudinally and transversely extending supporting elements carried by said frame and through which said barrels extend, means for shifting said elements longitudinally and transversely with respect to the frame for varying the angle of divergence of certain of said gun barrels with respect to the others, and means for tilting said frame for varying the angle of elevation thereof and of the gun barrels.

5. A machine gun comprising a mount, sets of vertically disposed gun barrels pivoted on end with said mount and arranged in transverse spaced relation, longitudinally and transversely extending supporting elements for said gun barrels, individual firing mechanisms for each of said gun barrels, means common to said firing mechanisms for actuating the same simultaneously, means for shifting certain of said elements for varying the angle of divergence of certain of said gun barrels with respect to the others, a magazine for each of said gun barrels, an individual loading mechanism for each of the said gun barrels and magazine, and means common to all of said loading mechanisms for actuating the same simultaneously.

6. A gun as characterized comprising a mount, a plurality of vertically disposed gun barrels massed on said mount in transverse spaced relation, a magazine for each of said gun barrels, an individual loading mechanism for each of said gun barrels and magazines, a means common to all of said loading mechanisms for actuating the same simultaneously, and means for selectively setting said actuating means for effecting the loading of the said gun barrels by groups.

7. A gun as characterized comprising a mount, a plurality of vertically disposed gun barrels massed on said mount in transverse spaced relation and in groups to either side of the longitudinal center thereof, individual firing mechanisms for each of said gun barrels, shiftable supporting means for said barrels extending around each of the barrels, a means common to all of the several firing mechanisms for actuating the same simultaneously, and a means for setting said actuating means for selectively firing the separate groups of said gun barrels.

8. A gun as characterized comprising a mount, a plurality of vertically disposed gun barrels massed on said mount in transverse spaced relation and in groups of parallel rows to either side of the longitudinal center thereof, individual firing mechanisms for each of said gun barrels, shiftable supporting means for said barrels extending around each of the barrels, a means common to all of the several firing mechanisms for actuating the same simultaneously, and a means for selectively setting said actuating means for firing one or more of the rows of gun barrels of a separate group from one side thereof.

9. A gun as characterized comprising a mount, a plurality of vertically disposed gun barrels massed on said mount in transverse spaced relation and in groups of parallel rows to either side of the longitudinal center thereof, individual loading mechanisms for each of said gun barrels, a means common to all of the several loading mechanisms for actuating the same simultaneously and means for selectively setting said actuating means for loading said gun barrels in the separate groups thereof or in the several separate rows of each group of the same.

10. A gun as characterized comprising a mount, a plurality of vertically disposed gun barrels massed on said mount in transverse spaced relation, longitudinally and transversely extending shiftable supporting means for said barrels and through which the barrels extend, individual firing mechanisms for each of said gun barrels, a magazine for each of said gun barrels, individual loading mechanism for each of said gun barrels and magazines, means for actuating said firing mechanisms simultaneously, and means for actuating said loading mechanism simultaneously after the operation of said firing mechanisms.

11. A gun as characterized comprising a mount, a plurality of vertically disposed gun barrels massed on said mount in transverse spaced relation, individual firing mechanisms for each of said gun barrels, a magazine for each of said gun barrels, individual loading mechanisms for each of said gun barrels and magazines, means for actuating said firing mechanisms simultaneously, means for actuating said loading mechanisms simultaneously after the operation of said firing mechanisms, means for selectively setting said actuating means for the actuation of said firing mechanisms simultaneously or in groups thereof, and means for selectively setting the actuating means of said loading mechanisms for the actuation of the latter simultaneously or in groups correspondingly with the actuation of said firing mechanisms.

12. A gun as characterized comprising a mount, a turn-table on said mount, a plurality of vertically disposed gun barrels massed centrally on said turn-table, an operator's platform carried on said turn-table at one side of said gun barrels, interengaging longitudinally and transversely extending shiftable supporting means for said barrels and further constituting means when shifted for varying the angle of divergence of said gun barrels, means for revolving said turn-table on said mount, and means for varying the angle of elevation of said gun barrels, all of said means being operable from said platform.

13. The combination of longitudinally extending beams constituting the chassis of a motor truck or the like, a turn-table mounted on said beams, a plurality of gun barrels massed on said turn-table, and inter-engaging longitudinally and transversely extending shiftable supporting elements for said barrels and further constituting means when shifted for varying the angle of divergence of said gun barrels.

14. The combination of longitudinally extending beams constituting the chassis of a motor truck or the like, a turn-table mounted on said beams, a plurality of gun barrels massed on said turn-table, longitudinally and transversely extending shiftable supporting elements and further constituting means when shifted for varying the angle of divergence of said gun barrels, means for revolving said turn-table, and means for varying the angle of elevation of said gun barrels.

15. The combination of spaced longitudinally extending beams, similarly arranged beams mounted above said first mentioned beams, a turn-table mounted between the lower and upper of said beams and supporting the latter thereof, a plurality of vertically disposed gun barrels massed in transversed spaced relation and supported in position on said turn-table, a platform carried by the upper of said beams to one side of said gun barrels, means for varying the angle of divergence of said gun barrels, means for revolving said turn-table, and means for varying the angle of elevation of said gun barrels, all of said means being adapted for manipulation from said platform.

16. The combination of spaced longitudinally extending beams, similarly arranged beams mounted above said first mentioned beams, a turn-table mounted between the lower and upper of said beams and supporting the latter thereof, a plurality of vertically disposed gun barrels massed in transverse spaced relation and supported in position on said turn-table, a platform carried by the upper of said beams to one side of said gun barrels, a housing carried on said upper beams and enclosing said gun barrels and said platform, means for opening the roof portion of said housing for the firing of the guns upwardly therethrough, means for varying the angle of divergence of said gun barrels, means for revolving said turn-table, and means for varying the angle of elevation of said gun barrels, all of said means being adapted for manipulation from said platform.

17. A machine gun comprising a mount, a plurality of vertically disposed gun barrels massed on said mount in transverse spaced relation and in groups of parallel rows to either side of the longitudinal center thereof, shiftable supporting elements for and through which extend said gun barrels and further constituting means when shifted for varying the angle of divergence of certain of said gun barrels with respect to the others, means for shifting said elements, individual firing mechanisms for each of said gun barrels, means common to all of the firing mechanisms for actuating the same simultaneously, and means for selectively setting said actuating means for firing one or more of the rows of gun barrels of each group from either side thereof.

18. A machine gun comprising a mount, a plurality of vertically disposed gun barrels pivoted on end with said mount and arranged in transverse spaced relation, shiftable supporting elements for and through which said barrels extend and further constituting means when shifted to vary the angle of divergence of certain of said gun barrels with respect to the others, individual firing mechanisms for each of said gun barrels, a magazine for each of said gun barrels, individual loading mechanisms for each of said gun barrels and magazines, means for actuating said firing mechanisms simultaneously, means for actuating said loading mechanisms simultaneously after the operation of said firing mechanisms, means for selectively setting said actuating means for the actuation of said firing mechanisms simultaneously or in groups thereof, and means for selectively setting the actuating means of said loading mechanisms for the actuation of the latter simultaneously or in groups correspondingly with the actuation of said firing mechanisms.

In testimony whereof, I affix my signature hereto.

PETER A. DUPCZA.